US012140077B2

(12) United States Patent
Wiedenhoefer et al.

(10) Patent No.: US 12,140,077 B2
(45) Date of Patent: Nov. 12, 2024

(54) AIRCRAFT HEAT EXCHANGER ASSEMBLY

(71) Applicant: Raytheon Technologies Corporation, Farmington, CT (US)

(72) Inventors: James F. Wiedenhoefer, Windsor, CT (US); Patrick M. Hart, Newington, CT (US); Russell J. Bergman, South Windsor, CT (US); William D. Blickenstaff, Port Saint Lucie, FL (US); William P. Stillman, Westminster, CO (US); Scott D. Virkler, Ellington, CT (US)

(73) Assignee: RTX Corporation, Farmington, CT (US)

( * ) Notice: Subject to any disclaimer, the term of this patent is extended or adjusted under 35 U.S.C. 154(b) by 161 days.

(21) Appl. No.: 17/790,727

(22) PCT Filed: Dec. 29, 2020

(86) PCT No.: PCT/US2020/067289
§ 371 (c)(1),
(2) Date: Jul. 2, 2022

(87) PCT Pub. No.: WO2021/138307
PCT Pub. Date: Jul. 8, 2021

(65) Prior Publication Data
US 2023/0046525 A1 Feb. 16, 2023

Related U.S. Application Data

(60) Provisional application No. 62/971,716, filed on Feb. 7, 2020, provisional application No. 62/971,446, filed
(Continued)

(51) Int. Cl.
*F02C 7/00* (2006.01)
*F02C 7/18* (2006.01)
(Continued)

(52) U.S. Cl.
CPC ............... *F02C 7/185* (2013.01); *F28D 1/03* (2013.01); *F02K 3/115* (2013.01);
(Continued)

(58) Field of Classification Search
CPC ...... F02C 7/185; F05D 2260/213; F28D 1/03; F02K 3/115
See application file for complete search history.

(56) References Cited

U.S. PATENT DOCUMENTS 1,311,549 A 7/1919 Bowman
3,552,488 A 1/1971 Grill et al.
(Continued)

FOREIGN PATENT DOCUMENTS

CN 101309577 A 11/2008
CN 108869044 A 11/2018
(Continued)

OTHER PUBLICATIONS

European Office Action dated Sep. 27, 2023 for European Patent Application No. 21191780.2.
(Continued)

*Primary Examiner* — Katheryn A Malatek
(74) *Attorney, Agent, or Firm* — Bachman & LaPointe, P.C.

(57) ABSTRACT

A heat exchanger for providing thermal energy transfer between a first flow along a first flowpath and a second flow along a second flowpath has a plate bank having a plurality of plates, each plate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. An inlet manifold has at least one inlet port and at least one outlet
(Continued)

port. An outlet manifold has at least one outlet port and at least one inlet port. The first flowpath passes from the at least one inlet port of the inlet manifold, through the at least one passageway of each of the plurality of plates, and through the at least one outlet port of the outlet manifold.

21 Claims, 19 Drawing Sheets

Related U.S. Application Data on Feb. 7, 2020, provisional application No. 62/957,091, filed on Jan. 3, 2020.

(51) Int. Cl.
| | |
|---|---|
| *F28D 1/03* | (2006.01) |
| *F02K 3/115* | (2006.01) |
| *F28D 1/02* | (2006.01) |
| *F28D 21/00* | (2006.01) |
| *F28F 3/02* | (2006.01) |
| *F28F 3/04* | (2006.01) |

(52) U.S. Cl.
CPC .... *F05D 2220/32* (2013.01); *F05D 2260/213* (2013.01); *F28D 2001/0273* (2013.01); *F28D 2021/0026* (2013.01); *F28F 3/025* (2013.01); *F28F 3/048* (2013.01)

(56) References Cited

U.S. PATENT DOCUMENTS

| | | | |
|---|---|---|---|
| 4,137,705 A | 2/1979 | Anderson et al. | |
| 4,438,809 A | 3/1984 | Papis | |
| 4,520,868 A | 6/1985 | Grawey | |
| 4,715,431 A | 12/1987 | Schwarz et al. | |
| 4,813,112 A | 3/1989 | Pilliez | |
| 5,009,263 A | 4/1991 | Seshimo et al. | |
| 5,107,922 A | 4/1992 | So | |
| 5,318,114 A * | 6/1994 | Sasaki | F28F 9/0204 165/177 |
| 5,417,280 A | 5/1995 | Hayashi et al. | |
| 5,443,116 A | 8/1995 | Hayashi et al. | |
| 5,517,757 A | 5/1996 | Hayashi et al. | |
| 5,531,268 A | 7/1996 | Hoshino et al. | |
| 5,718,127 A | 2/1998 | Aitken | |
| 6,134,880 A | 10/2000 | Yoshinaka | |
| 6,328,100 B1 | 12/2001 | Haussmann | |
| 6,357,113 B1 | 3/2002 | Williams | |
| 6,422,307 B1 | 7/2002 | Bhatti et al. | |
| 6,430,931 B1 | 8/2002 | Horner | |
| 6,564,863 B1 | 5/2003 | Martins | |
| 6,607,026 B1 | 8/2003 | Naji et al. | |
| 6,945,320 B2 | 9/2005 | Harvard, Jr. et al. | |
| 6,966,173 B2 | 11/2005 | Dewis | |
| 7,334,411 B2 | 2/2008 | Vandermolen | |
| 7,669,645 B2 | 3/2010 | Nakamura | |
| 7,770,633 B2 | 8/2010 | Miyahara | |
| 7,784,528 B2 | 8/2010 | Ottow et al. | |
| 7,861,512 B2 | 1/2011 | Olver et al. | |
| 7,950,149 B2 | 5/2011 | Golecki | |
| 8,181,443 B2 | 5/2012 | Rago | |
| 8,266,888 B2 | 9/2012 | Liu | |
| 8,387,362 B2 | 3/2013 | Storage et al. | |
| 8,438,835 B2 | 5/2013 | Perveiler et al. | |
| 8,573,291 B2 | 11/2013 | Vick | |
| 8,656,988 B1 | 2/2014 | Paul et al. | |
| 8,689,547 B2 | 4/2014 | Burgers et al. | |
| 8,770,269 B2 | 7/2014 | Scott | |
| 8,784,047 B2 | 7/2014 | Elder | |
| 9,200,855 B2 | 12/2015 | Kington et al. | |
| 9,243,563 B2 | 1/2016 | Lo | |
| 9,328,968 B2 | 5/2016 | Vanderwees | |
| 9,377,250 B2 | 6/2016 | Landre | |
| 9,732,702 B2 | 8/2017 | Ueda | |
| 9,752,803 B2 | 9/2017 | Matter, III et al. | |
| 9,766,019 B2 | 9/2017 | Eleftheriou et al. | |
| 9,771,867 B2 | 9/2017 | Karam et al. | |
| 9,816,766 B2 | 11/2017 | Miller et al. | |
| 9,835,043 B2 | 12/2017 | Kantany et al. | |
| 9,851,159 B2 | 12/2017 | Cameron | |
| 9,909,812 B2 | 3/2018 | Peskos et al. | |
| 9,982,630 B2 | 5/2018 | Marini et al. | |
| 10,041,741 B2 | 8/2018 | Turcotte et al. | |
| 10,100,740 B2 | 10/2018 | Thomas | |
| 10,125,684 B2 | 11/2018 | Yu | |
| 10,175,003 B2 | 1/2019 | Sennoun et al. | |
| 10,184,400 B2 | 1/2019 | Cerny et al. | |
| 10,208,621 B2 | 2/2019 | Hoefler et al. | |
| 10,221,768 B2 | 3/2019 | Agg | |
| 10,222,142 B2 | 3/2019 | Alvarez et al. | |
| 10,316,750 B2 | 6/2019 | Loebig et al. | |
| 10,422,585 B2 | 9/2019 | Jensen et al. | |
| 10,480,407 B2 | 11/2019 | Alecu | |
| 10,830,540 B2 | 11/2020 | Sennoun et al. | |
| 10,926,364 B2 | 2/2021 | Thresher | |
| 11,219,841 B2 | 1/2022 | Wan et al. | |
| 2001/0018024 A1 | 8/2001 | Hyde et al. | |
| 2004/0026072 A1 | 2/2004 | Yi et al. | |
| 2004/0040153 A1 | 3/2004 | Ashida et al. | |
| 2004/0050531 A1 | 3/2004 | Horiuchi et al. | |
| 2004/0111829 A1 | 6/2004 | Bruno et al. | |
| 2006/0131009 A1 | 6/2006 | Nies | |
| 2009/0169359 A1 | 7/2009 | Murphy et al. | |
| 2010/0084120 A1 | 4/2010 | Mn et al. | |
| 2010/0170262 A1 | 7/2010 | Kaslusky et al. | |
| 2011/0088405 A1 | 4/2011 | Turco | |
| 2011/0146944 A1 | 6/2011 | Hand et al. | |
| 2011/0168366 A1 | 7/2011 | Garret et al. | |
| 2013/0199152 A1 | 8/2013 | Menheere et al. | |
| 2013/0213623 A1 | 8/2013 | Perocchio et al. | |
| 2014/0246179 A1 | 9/2014 | Vallee et al. | |
| 2014/0318751 A1 | 10/2014 | Kinder et al. | |
| 2015/0047818 A1 | 2/2015 | Peskos et al. | |
| 2015/0047820 A1 | 2/2015 | Rhoden | |
| 2016/0069266 A1 | 3/2016 | Murphy et al. | |
| 2016/0123230 A1 | 5/2016 | Thomas | |
| 2016/0177828 A1 | 6/2016 | Snyder et al. | |
| 2016/0201989 A1 * | 7/2016 | Martinez | F02C 7/18 29/890.03 |
| 2016/0230595 A1 | 8/2016 | Wong et al. | |
| 2016/0230669 A1 | 8/2016 | Selstad et al. | |
| 2016/0265850 A1 | 9/2016 | Kupiszewski et al. | |
| 2016/0362999 A1 | 12/2016 | Ho | |
| 2017/0009703 A1 | 1/2017 | Moon et al. | |
| 2017/0184024 A1 | 6/2017 | Sennoun | |
| 2017/0363361 A1 | 12/2017 | Turney | |
| 2018/0051935 A1 | 2/2018 | Roberge | |
| 2018/0058472 A1 | 3/2018 | Tajiri et al. | |
| 2018/0172368 A1 | 6/2018 | Kowalski et al. | |
| 2018/0238238 A1 | 8/2018 | Luschek et al. | |
| 2018/0238630 A1 | 8/2018 | Pollard et al. | |
| 2018/0244127 A1 | 8/2018 | Sennoun et al. | |
| 2018/0245853 A1 * | 8/2018 | Sennoun | B33Y 80/00 |
| 2018/0258859 A1 | 9/2018 | Suciu et al. | |
| 2018/0292140 A1 | 10/2018 | Mayo et al. | |
| 2018/0328285 A1 | 11/2018 | Tajiri et al. | |
| 2019/0154345 A1 | 5/2019 | Martinez et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |
| 2019/0234690 A1 | 8/2019 | Sobolak et al. | |
| 2019/0277571 A1 | 9/2019 | Disori et al. | |
| 2019/0277579 A1 | 9/2019 | Disori et al. | |
| 2019/0293365 A1 | 9/2019 | Disori et al. | |
| 2019/0293366 A1 | 9/2019 | Disori et al. | |
| 2019/0310030 A1 | 10/2019 | Disori et al. | |
| 2019/0339012 A1 | 11/2019 | Disori et al. | |
| 2020/0072559 A1 | 3/2020 | Sennoun et al. | |
| 2020/0189046 A1 | 6/2020 | Ravindranath et al. | |
| 2020/0347737 A1 | 11/2020 | Bordoni | |
| 2020/0395890 A1 | 12/2020 | Hutting et al. | |

(56) References Cited

U.S. PATENT DOCUMENTS

| | | |
|---|---|---|
| 2021/0207535 A1 | 7/2021 | Bergman et al. |
| 2021/0222624 A1 | 7/2021 | Wiedenhoefer et al. |
| 2021/0222962 A1 | 7/2021 | Wiedenhoefer et al. |
| 2021/0222963 A1 | 7/2021 | Bergman et al. |
| 2021/0285375 A1 | 9/2021 | Wiedenhoefer et al. |
| 2021/0318071 A1 | 10/2021 | Hart et al. |

FOREIGN PATENT DOCUMENTS

| | | | |
|---|---|---|---|
| CN | 110553533 | A | 12/2019 |
| DE | 9309822 | U1 | 11/1994 |
| DE | 19515528 | A1 | 10/1996 |
| DE | 102004058499 | A1 | 6/2006 |
| DE | 102008051422 | A1 | 4/2010 |
| EP | 656517 | A1 | 11/1994 |
| FR | 2770632 | A1 | 5/1999 |
| FR | 3075870 | A1 | 6/2019 |
| GB | 574450 | A | 1/1946 |
| JP | H0961084 | A | 3/1997 |
| JP | 11-148793 | A | 6/1999 |
| WO | 2021/138307 | A1 | 7/2021 |

OTHER PUBLICATIONS

US Office Action dated Jul. 6, 2023 for U.S. Appl. No. 17/125,214 (published as 2021/0207535A1).
European Search Report dated Feb. 7, 2022 for European Patent Application No. 21740964.8 (PCT/US2021/013804-WO/2021/146674).
International Search Report and Written Opinion dated Mar. 31, 2021 for PCT/US2021/013804-WO/2021/146674.
Chris Wiegand et al., "F-35 Air Vehicle Technology Overview", Aviation Technology, Integration, and Operations Conference, Jun. 2018, American Institute of Aeronautics and Astronautics, Inc., Reston, Virginia.
Jonathan Lowell, "Keeping Cool over Salt Lake", Aug. 25, 2019, US Air Force, Washington, DC, retrieved from Internet Nov. 9, 2019 https://www.af.mil/News/Commentaries/Display/Article/1941943/keeping-cool-over-salt-lake/.
Sean Robert Nuzum, Thesis: "Aircraft Thermal Management using Liquefied Natural Gas", Apr. 27, 2016, Wright State University, Dayton, Ohio.
European Search Report and Opinion dated Oct. 20, 2021 for European Patent Application No. 20218011.3.
US Office Action dated Nov. 9, 2021 for US Patent Application No. 17/139,174.
US Office Action dated Dec. 13, 2021 for U.S. Appl. No. 17/124,551.
International Search Report and Written Opinion dated Mar. 19, 2021 for PCT/US20/67289-WO/2021/138307.
European Search Report dated Nov. 25, 2021 for European Patent Application No. 20910078.3 (EP stage of PCT/US20/67289-WO/2021/138307).
European Search Report dated Nov. 19, 2021 for European Patent Application No. 21191780.2 (EP divisional of PCT/US20/67289-WO/2021/138307).
Extended European Search Report dated Mar. 31, 2022 for European Patent Application No. 20910078.3 (EP stage of PCT/US20/67289-WO/2021/138307).
Extended European Search Report dated Mar. 31, 2022 for European Patent Application No. 21191780.2 (EP divisional of PCT/US20/67289-WO/2021/138307).
US Office Action dated Apr. 26, 2022 for U.S. Appl. No. 17/137,946.
Johnson, T., "F135 Propulsion Integration Topics", The 11th Symposium on Jet Engines and Gas Turbines, Oct. 25, 2012, p. 8, Technion—Israel Institute of Technology, Haifa, Israel.
US Office Action dated Jun. 21, 2022 for U.S. Appl. No. 17/139,180.

\* cited by examiner

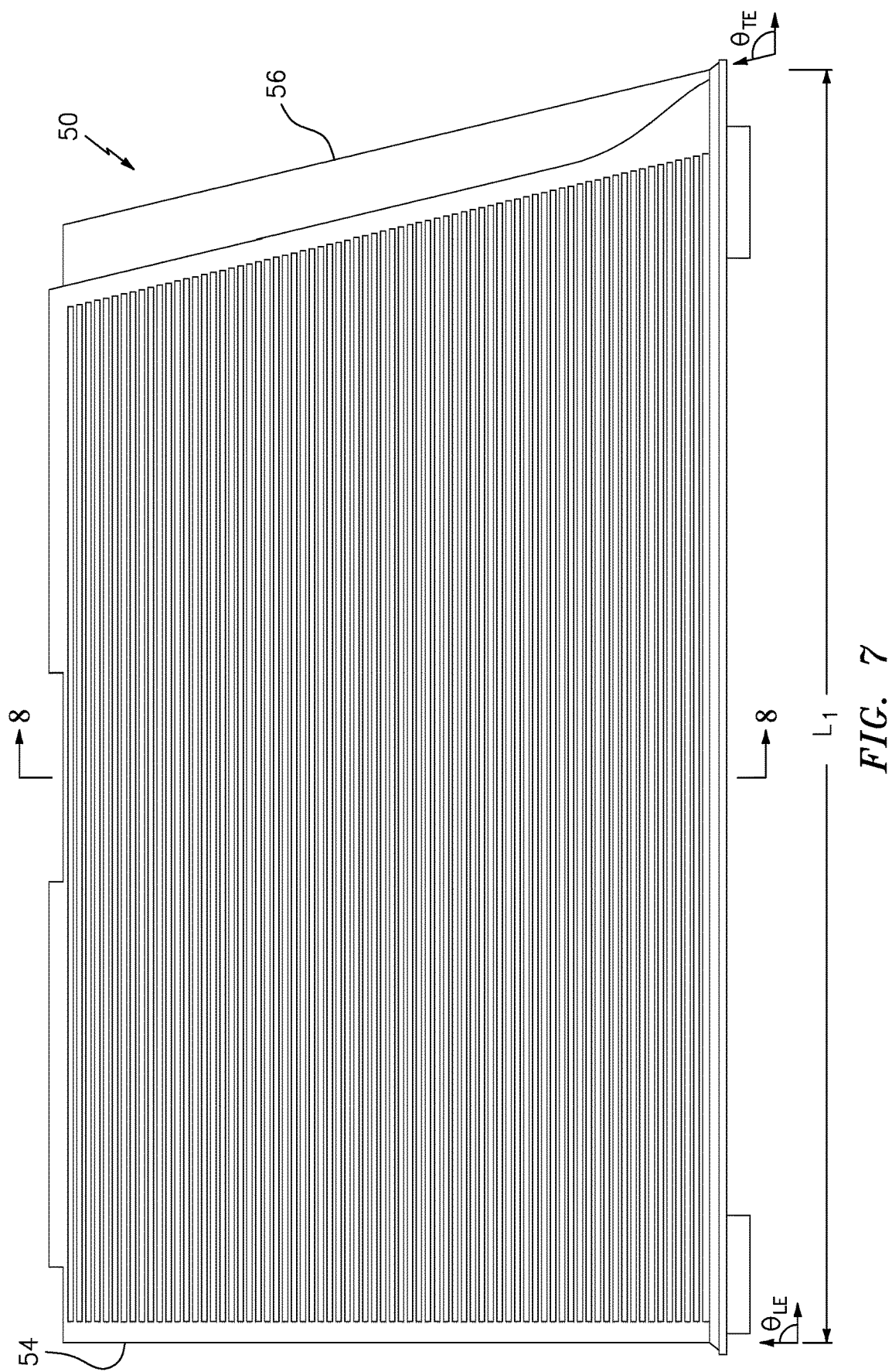

AIRCRAFT HEAT EXCHANGER ASSEMBLY

CROSS-REFERENCE TO RELATED APPLICATIONS

Benefit is claimed of U.S. Patent Application No. 62/971,716, filed Feb. 7, 2020, and entitled "Aircraft Heat Exchanger Assembly", U.S. Patent Application No. 62/971,446, filed Feb. 7, 2020, and entitled "Aircraft Heat Exchanger Panel Array Interconnection", and U.S. Patent Application No. 62/957,091, filed Jan. 3, 2020, and entitled "Aircraft Heat Exchanger Assembly", the disclosures of which are incorporated by reference herein in their entireties as if set forth at length.

BACKGROUND

The disclosure relates to gas turbine engine heat exchangers. More particularly, the disclosure relates to air-to-air heat exchangers.

Gas turbine engines (used in propulsion and power applications and broadly inclusive of turbojets, turboprops, turbofans, turboshafts, industrial gas turbines, and the like) include a variety of heat exchangers. Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling the turbine or aircraft systems. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For radially-extending plates in a radial array, the wave amplitude progressively increases to accommodate a similar increase in inter-plate spacing.

SUMMARY

One aspect of the disclosure involves a heat exchanger for providing thermal energy transfer between a first flow along a first flowpath and a second flow along a second flowpath. The heat exchanger has: at least one plate bank; an inlet manifold; and an outlet manifold. The plate bank has a plurality of plates, each plate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. The inlet manifold has at least one inlet port and at least one outlet port. The outlet manifold has at least one outlet port and at least one inlet port. The first flowpath passes from the at least one inlet port of the inlet manifold, through the at least one passageway of each of the plurality of plates, and through the at least one outlet port of the outlet manifold.

A further embodiment of any of the foregoing embodiments may additionally and/or alternatively include, for each plate of the plurality of plates, the at least one passageway comprising: an inlet plenum extending from the at least one inlet port of the plate; an outlet plenum extending to the at least one outlet port of the plate; and a plurality of legs fluidically in parallel between the inlet plenum and the outlet plenum.

A further embodiment of any of the foregoing embodiments may additionally and/or alternatively include: one or more reinforcement walls in the inlet plenum; and/or one or more reinforcement walls in the outlet plenum.

A further embodiment of any of the foregoing embodiments may additionally and/or alternatively include the inlet plenum being adjacent the trailing edge and the outlet plenum being adjacent the leading edge.

A further embodiment of any of the foregoing embodiments may additionally and/or alternatively include: the inlet manifold and outlet manifold being arcuate having a convex first face and a concave second face; and the at least one plate bank being mounted to the convex first face.

A further embodiment of any of the foregoing embodiments may additionally and/or alternatively include: the inlet manifold and outlet manifold being arcuate having a concave first face and a convex second face; and the at least one plate bank being mounted to the concave first face.

A further embodiment of any of the foregoing embodiments may additionally and/or alternatively include: the inlet manifold and outlet manifold being portions of a single unit; a buffer cavity being located between the inlet manifold and the outlet manifold; and the buffer cavity having at least one inlet and at least one outlet.

A further embodiment of any of the foregoing embodiments may additionally and/or alternatively include, in the at least one plate bank, the plates being parallel to each other.

A further embodiment of any of the foregoing embodiments may additionally and/or alternatively include: the at least one plate bank being a first plate bank and a second plate bank; the inlet manifold at least one inlet port being a single inlet port between the first plate bank and the second plate bank; and the outlet manifold at least one outlet port being a first outlet port to an outboard side of the first plate bank and a second outlet port to an outboard side of the second plate bank.

A further embodiment of any of the foregoing embodiments may additionally and/or alternatively include each said plate bank comprising a shroud interfitting with edge portions of the plates of said bank.

A further embodiment of any of the foregoing embodiments may additionally and/or alternatively include each said plate bank comprising a shroud having: first and second end walls at opposite ends of the associated plate bank; respective first and second flanges securing the first and second end walls to the inlet manifold and outlet manifold; and a further wall joining the first and second end walls.

A further embodiment of any of the foregoing embodiments may additionally and/or alternatively include each plate further comprising an external fin array.

A further embodiment of any of the foregoing embodiments may additionally and/or alternatively include respective external fin arrays connecting adjacent said plates.

A further embodiment of any of the foregoing embodiments may additionally and/or alternatively include a gas turbine engine including the heat exchanger.

A further embodiment of any of the foregoing embodiments may additionally and/or alternatively include: the first flow being a bleed flow; and the second flow being a bypass flow.

A further embodiment of any of the foregoing embodiments may additionally and/or alternatively include the heat exchanger being in a bypass flowpath.

A further embodiment of any of the foregoing embodiments may additionally and/or alternatively include a method for manufacturing the heat exchanger, the method comprising: casting the plates; additively manufacturing or casting the inlet manifold and the outlet manifold separately from the plates; and attaching the plates to the inlet manifold and outlet manifold.

A further embodiment of any of the foregoing embodiments may additionally and/or alternatively include the inlet manifold and outlet manifold being additively manufactured or cast as a unit.

A further embodiment of any of the foregoing embodiments may additionally and/or alternatively include the attaching comprising inserting each proximal edge into a socket.

A further embodiment of any of the foregoing embodiments may additionally and/or alternatively include the attaching comprising brazing, welding, transient liquid phase bonding, or diffusion bonding.

A further embodiment of any of the foregoing embodiments may additionally and/or alternatively include a method for using the heat exchanger, the method comprising: passing the first flow along the first flowpath; and passing the second flow along the second flowpath to transfer said thermal energy from the first flow to the second flow.

A further embodiment of any of the foregoing embodiments may additionally and/or alternatively include the second flow passing along the plate first faces and plate second faces.

A further embodiment of any of the foregoing embodiments may additionally and/or alternatively include passing a diversion of the second flow through a buffer cavity between the inlet manifold and the outlet manifold.

Another aspect of the disclosure involves a heat exchanger plate for providing heat transfer between a first flow along a first flowpath and a second flow along a second flowpath. The heat exchanger plate comprises: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath.

A further embodiment of any of the foregoing embodiments may additionally and/or alternatively include: the at least one passageway comprising: an inlet plenum extending from the at least one inlet port of the plate; an outlet plenum extending to the at least one outlet port of the plate; and a plurality of legs fluidically in parallel between the inlet plenum and the outlet plenum.

A further embodiment of any of the foregoing embodiments may additionally and/or alternatively include: the inlet plenum being adjacent the trailing edge; and the outlet plenum being adjacent the leading edge.

A further embodiment of any of the foregoing embodiments may additionally and/or alternatively include: the inlet plenum tapering away from the proximal edge; and the outlet plenum tapering away from the proximal edge.

A further embodiment of any of the foregoing embodiments may additionally and/or alternatively include: the leading edge being 88° to 92° off the proximal edge; and the trailing edge being more than 95° off the proximal edge in exterior angle so that a length decreases from the proximal edge to the distal edge.

A further embodiment of any of the foregoing embodiments may additionally and/or alternatively include: the plurality of legs being separated by dividing walls extending between a first interior face and a second interior face.

A further embodiment of any of the foregoing embodiments may additionally and/or alternatively include: the first interior face and the second interior face having integral surface enhancements.

A further embodiment of any of the foregoing embodiments may additionally and/or alternatively include the integral surface enhancements being chevron arrays.

A further embodiment of any of the foregoing embodiments may additionally and/or alternatively include the integral surface enhancements being non-uniform between adjacent legs.

A further embodiment of any of the foregoing embodiments may additionally and/or alternatively include the dividing walls having turns at the inlet plenum.

A further embodiment of any of the foregoing embodiments may additionally and/or alternatively include the dividing wall turns being non-uniform between adjacent legs.

A further embodiment of any of the foregoing embodiments may additionally and/or alternatively include the dividing wall turns progressively decreasing in length away from the proximal edge.

A further embodiment of any of the foregoing embodiments may additionally and/or alternatively include the dividing walls lacking turns at the outlet plenum.

A further embodiment of any of the foregoing embodiments may additionally and/or alternatively include cross-sectional area being non-uniform between adjacent legs A further embodiment of any of the foregoing embodiments may additionally and/or alternatively include a straight portion length of the dividing walls being non-uniform between adjacent legs.

A further embodiment of any of the foregoing embodiments may additionally and/or alternatively include the first face and second face including heat transfer augmentation features.

A further embodiment of any of the foregoing embodiments may additionally and/or alternatively include at least one of the first face and second face including fins.

A further embodiment of any of the foregoing embodiments may additionally and/or alternatively include the fins being formed by a metallic sheet corrugation secured to a substrate of the heat exchanger.

A further embodiment of any of the foregoing embodiments may additionally and/or alternatively include the heat exchanger plate comprising a cast substrate.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 7 is a side view of a plate of the heat exchanger.

Like reference numbers and designations in the various drawings indicate like elements.

DETAILED DESCRIPTION

Figure 1:
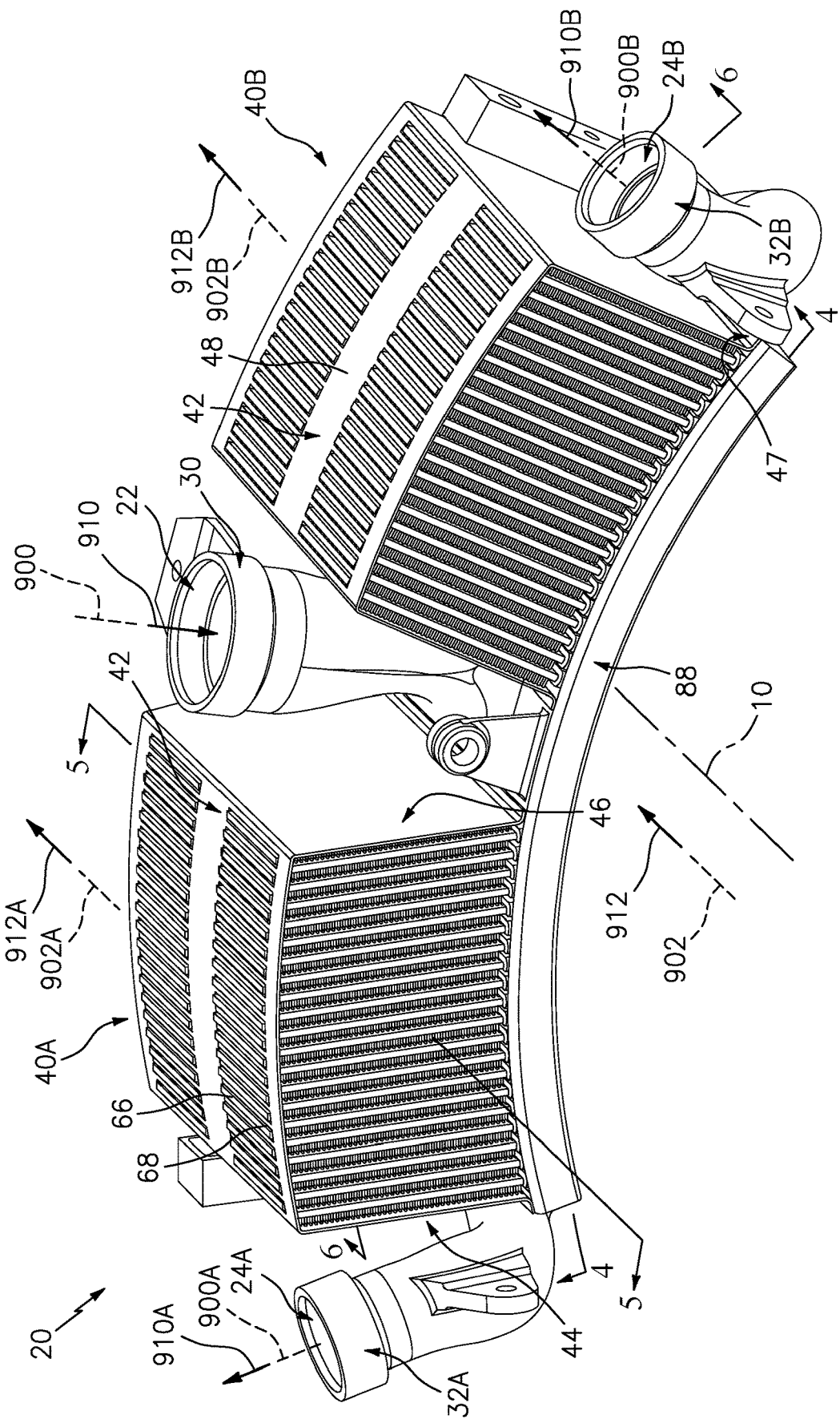
FIG. 1 is a view of a heat exchanger.

FIG. 1 shows a gas turbine engine heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters and exits the heat exchanger 20 as a single piped flow and exits as a branched flow 910A/910B along branches 900A/900B; whereas the flow 912 is sector portion of an axial annular flow surrounding a central longitudinal axis 10 of the heat exchanger and associated engine. The exemplary view has components such as mounting hardware, deflectors/blockers, and structural brace hardware removed for purposes of illustration.

The heat exchanger 20 has an inlet 22 and outlet 24A, 24B for the first flow. The exemplary inlet and outlet are, respectively, ports of an inlet manifold and an outlet manifold (discussed below). Exemplary manifolds are metallic (e.g., nickel-based superalloy). The inlet manifold and outlet manifold may each have a respective fitting 30, 32A, 32B providing the associated port 22, 24A, 24B. As is discussed further below, the inlet manifold and outlet manifold are coupled to heat exchanger plates of two exemplary plate (panel) arrays (banks) 40A, 40B. In the exemplary configuration, the single first flow inlet 22 is centrally between the banks open radially outward to receive an inward radial flow. Similarly, the two exemplary first flow outlets 24A, 24B are at circumferential outboard ends of the associated plate banks and are also open radially outward to discharge radially outward.

Each plate bank 40A, 40B comprises a circumferential array of plates (discussed further below). In the exemplary banks, the plates are parallel to each other. However, alternative banks may have the plates extending more exactly radially so as to diverge from each other in the outward radial direction.

In the exemplary embodiment, inner diameter (ID) edges of the plates mate to the manifolds and outer diameter (OD) edges of the plates of the banks are captured by respective shrouds 42. The shrouds 42 each have a first circumferential end (end wall) 44 and a second circumferential end (end wall) 46 abutting terminal plates of the associated bank. The ends are joined by an outer diameter (OD) circumferential wall 48. As discussed further below, the OD wall 48 has slots receiving associated projections of the plates to retain and register the plates. The shrouds thus bound duct sectors passing respective branches 902A, 902B of the second flow 912A, 912B along respective branches of the second flowpath 902.

Figure 2:
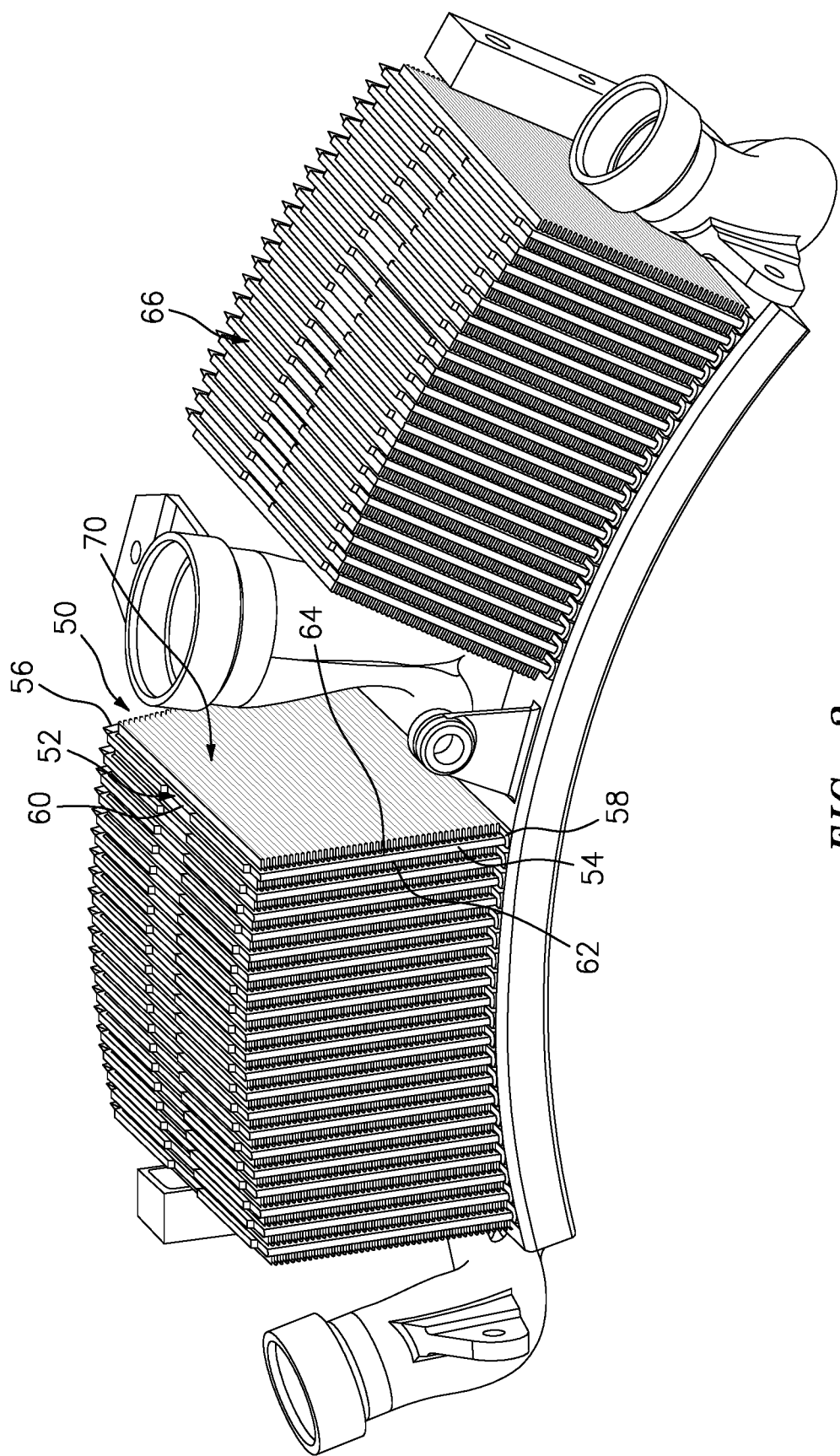
FIG. 2 is a view of the heat exchanger of FIG. 1 with plate bank shrouds removed.

FIG. 2 shows the heat exchanger with shrouds further removed for purposes of illustration.

Each plate 50 comprises a body or substrate 52 (e.g., cast or additively manufactured alloy such as nickel-based superalloy) having a leading edge 54, a trailing edge 56, an inboard or inner diameter (ID) edge 58, an outboard or outer diameter (OD) edge 60, a first circumferential (generally circumferentially facing) face 62 and a second circumferential face 64. The OD edge 60 may bear one or more (two shown) projections 66 which become captured by associated slots 68 (FIG. 1) in the shroud OD wall 48 as noted above.

As is discussed below, one or both faces 62, 64 may bear fin arrays 70. Although fin arrays formed unitarily with the body or substrate are possible, the exemplary fins are separately formed (e.g., of folded sheetmetal—e.g., nickel-based superalloy) and secured to adjacent substrate(s) (generally see the '740 patent). As is discussed further below, exemplary fins are square wave corrugations of even height/amplitude so that the plates are parallel with each inter-plate gap in each bank being spanned by a respective one fin array whose peaks are secured to one adjacent substrate and troughs to the other (discussed further below).

Figure 3:
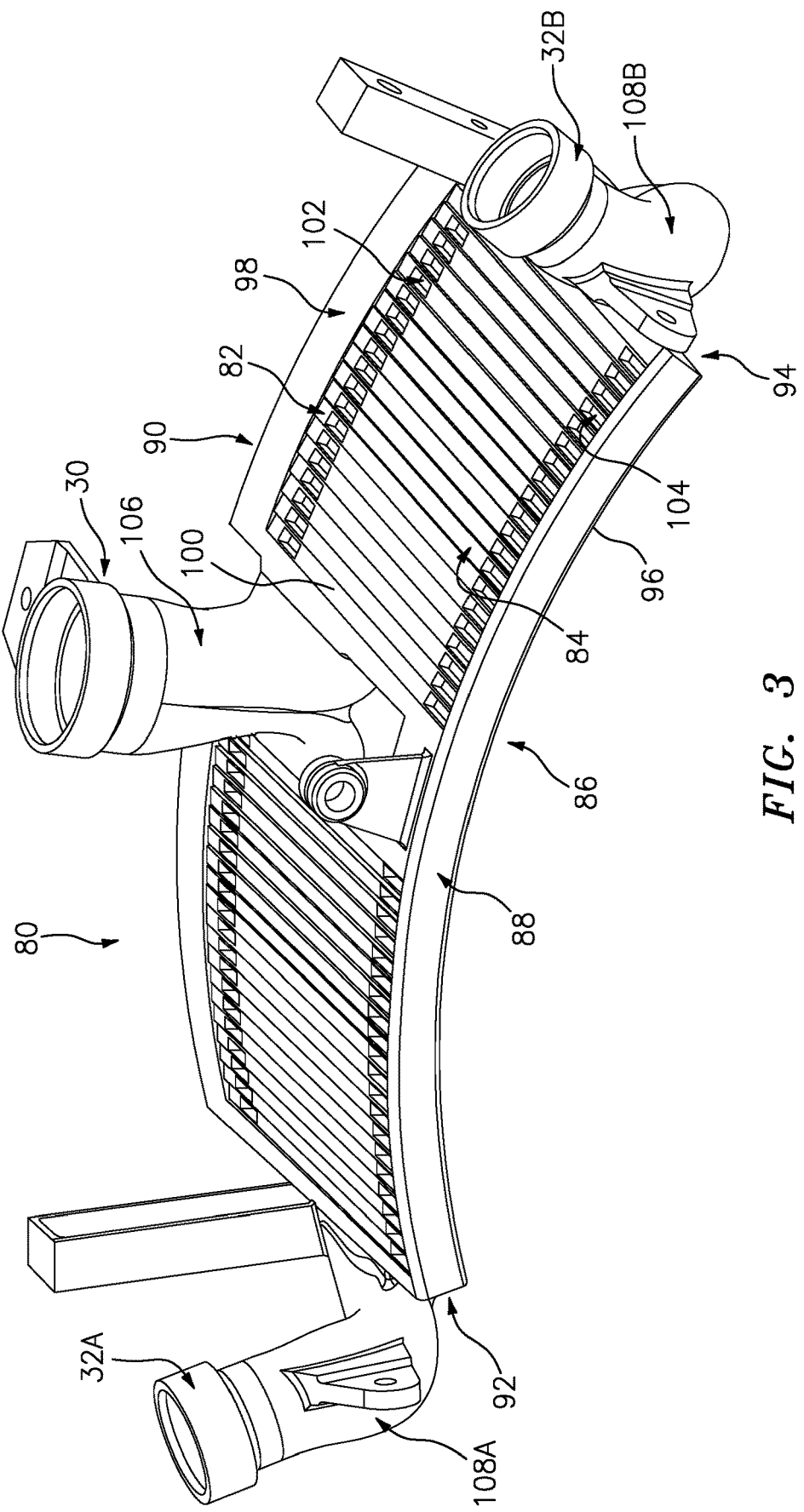
FIG. 3 is a view of an inner diameter (ID) manifold unit of the heat exchanger.

FIG. 3 shows further details of a single manifold unit 80 that forms both an inlet manifold 82 and an outlet manifold 84 of the heat exchanger. As is discussed further below, the outlet manifold 84 is fully split between sections respectively associated with the two banks 40A, 40B.

The manifold unit 80 comprises a main body 86 having a leading end 88, a trailing end 90, a first circumferential end 92, a second circumferential end 94, an inner diameter (ID) surface 96, and an outer diameter (OD) surface 98. The OD surface 98 has a plurality of mating features for receiving the associated plates (e.g., the ID edges 58 of the plate substrates). Exemplary features 100 are formed as full or partial sockets extending axially and having respective ports 102 and 104 for communicating with the plate interior (discussed further below). The exemplary features 100 have flat base surfaces that mate with the respective associated plate ID edge 58. In the exemplary embodiment, the features 100 are progressively stepped along the manifold OD surface (e.g., flats stepped to form partial sockets open at one side) to allow the bank to better conform to and fill the duct segment while maintaining plate parallelism. In this example, stepping causes the shroud OD circumferential wall 48 to be convex outward to conform to the outer diameter boundary of the duct.

FIG. 3 further shows an integrally formed radial conduit 106 extending to the first flow inlet fitting 30 and respective integral conduits 108A, 108B extending to the respective first flow outlet fittings 32A, 32B. The exemplary conduit 106 protrudes radially from the main body OD surface 98. The conduits 108A, 108B protrude circumferentially from the associated main body ends 92 and 94, then turning radially outward at a bend.

Figure 4:
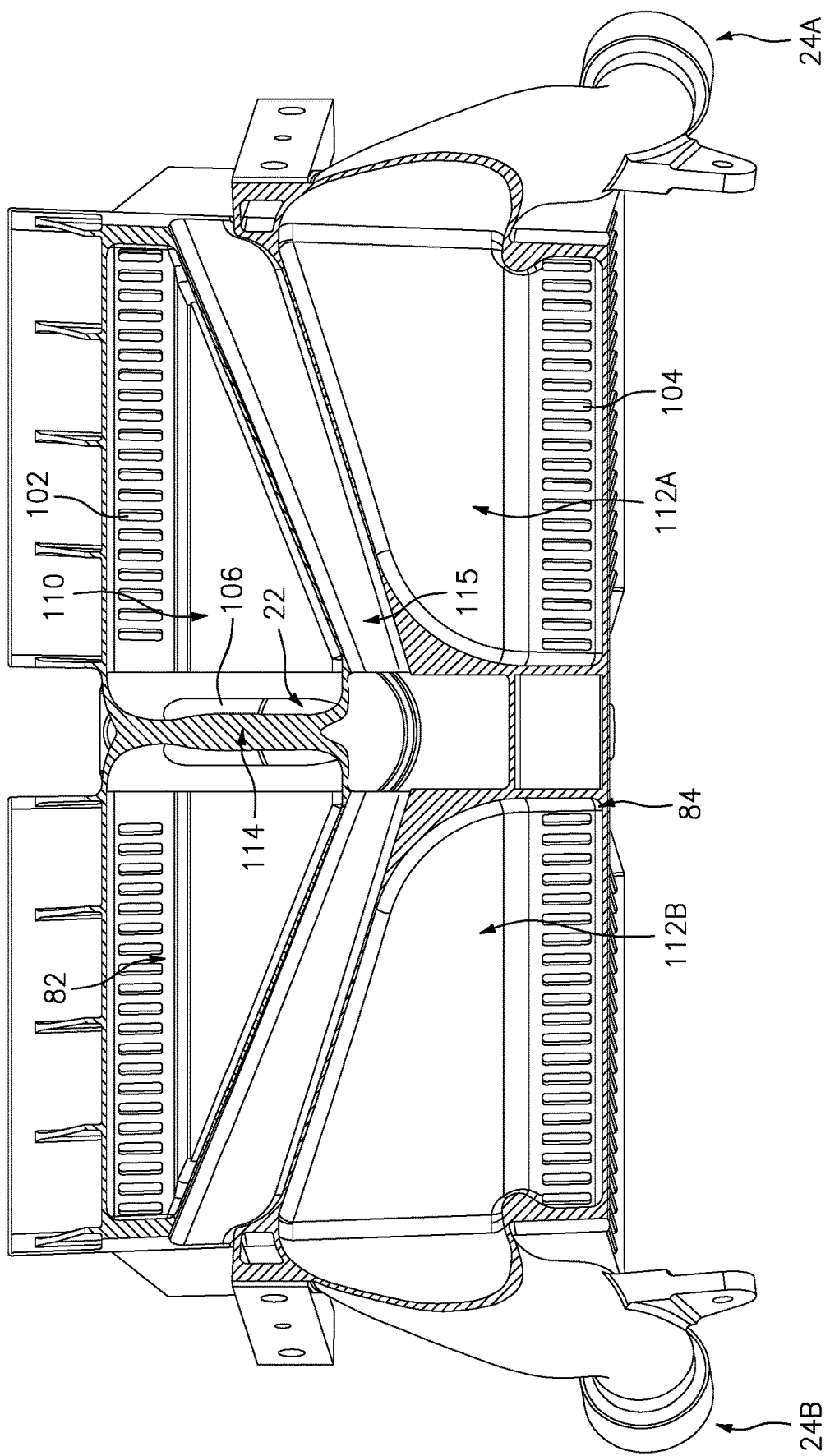
FIG. 4 is an outward radial cutaway view of the heat exchanger taken along line 4-4 of FIG. 1.

FIG. 4 is a circumferential sectional view viewed radially outward. FIG. 4 shows the inlet manifold 82 as including a plenum 110 extending from the inlet port 22 to the ports 102. The outlet manifold 84 comprises a pair of independent plenums 112A and 112B extending from the ports 104 of the associated array to the outlets 24A, 24B. FIG. 4 shows a dividing wall 114 extending partially outward into the conduit 106 to divide downstream sections of the plenum 110. A dead space or buffer cavity 115 divides the inlet manifold from the outlet manifold and divides the two plenums of the outlet manifold to effectively form two outlet manifolds in a single piece or assembly.

An exemplary manifold unit 80 may be formed of a nickel-based superalloy such as via casting, additive manufacture, and/or machining. Particularly if additively manufactured, assembly of multiple pieces may be required (e.g., via brazing, welding, or diffusion bonding).

Figure 5:
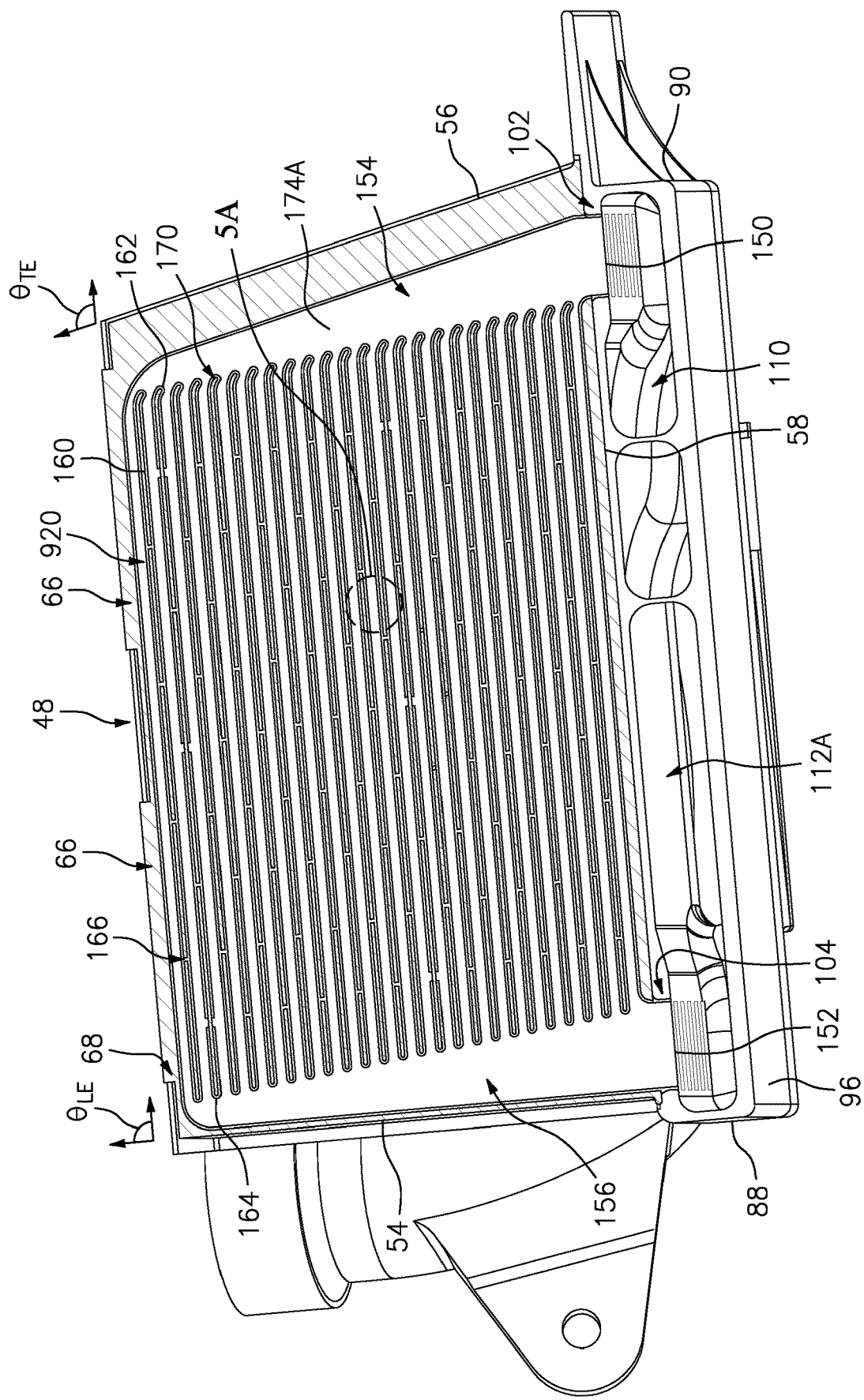
FIG. 5 is an approximately radial/axial sectional view of the heat exchanger taken along line 5-5 of FIG. 1 centrally through a plate.

FIG. 5 is a sectional view through a panel in the heat exchanger taken along line 5-5 of FIG. 1. Each plate has an interior providing an associated flowpath branch/leg from an inlet 150 of the plate to an outlet 152. The exemplary inlets and outlets are along the ID edge 58 (e.g., on plugs protruding from a flat main portion of the ID edge and received in the respective ports 102 and 104). The inlet 150 feeds an inlet plenum 154 adjacent/along the trailing edge while the outlet 152 is fed by a plenum 156 along the leading edge.

Figure 6:
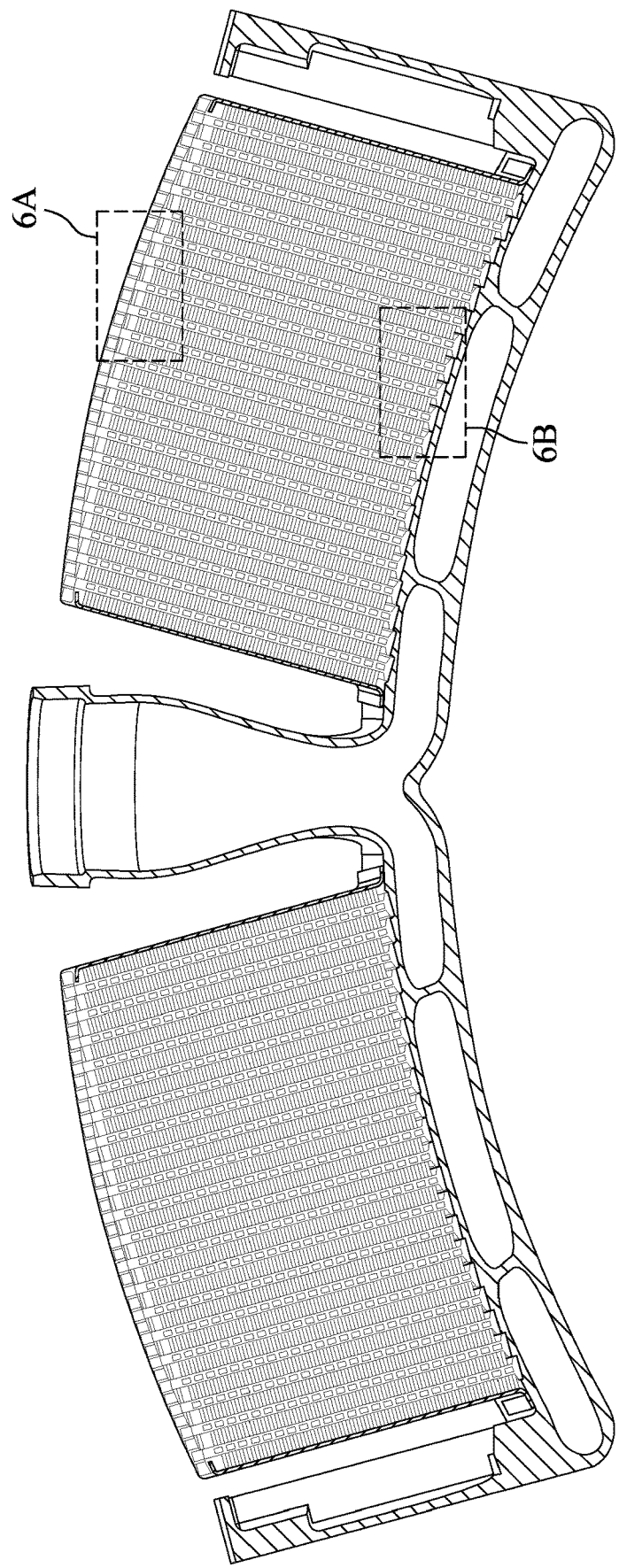
FIG. 6 is a transverse sectional view of the heat exchanger of FIG. 1 taken along line 6-6.
Figure 6A:
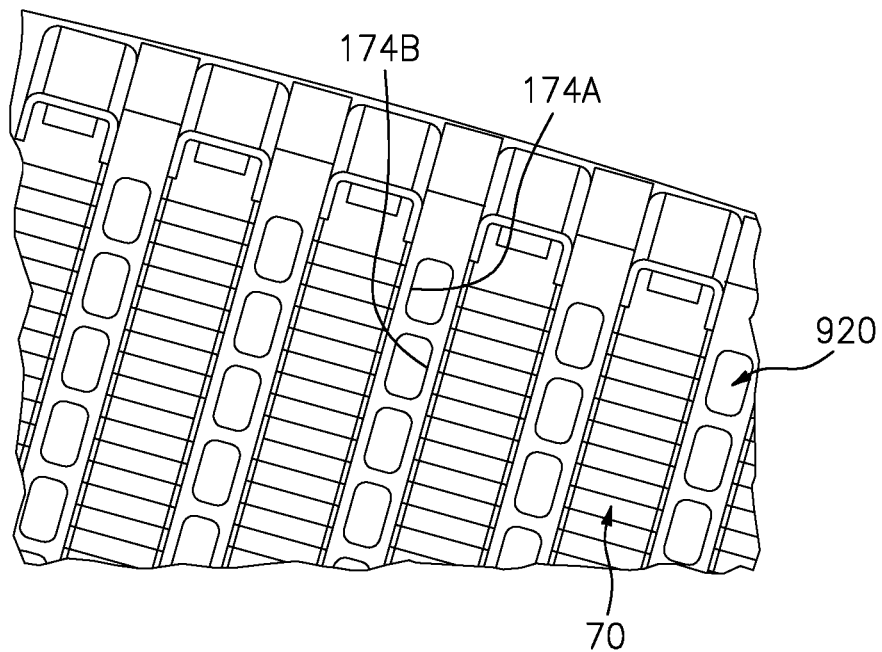
FIG. 6A is a first enlarged view of the heat exchanger of FIG. 6.
Figure 6B:
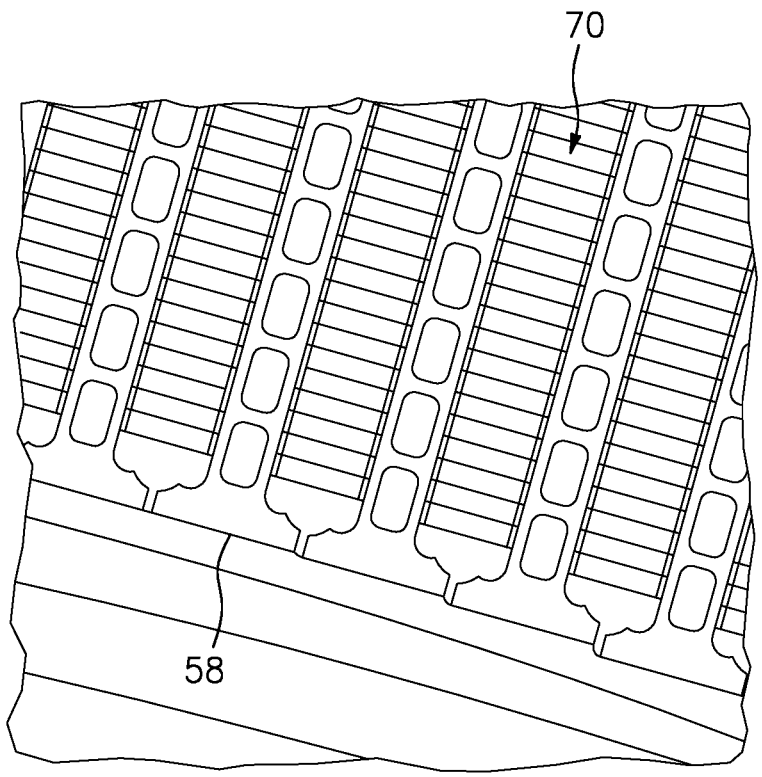
FIG. 6B is a second enlarged view of the heat exchanger of FIG. 6.

A generally radial array of flowpath legs (sublegs) 920 extend between the inlet plenum 154 and outlet plenum 156. The adjacent flowpath legs 920 are separated from each other by wall structures 160. Each wall structure 160 extends from a leading end 162 to a trailing end 164 (along the first flowpath). The exemplary wall structures may have gaps 166. The gaps may provide pressure equalization and/or may be artifacts of a casting process wherein core legs forming the passageway legs 920 are held in alignment with each other by webs that in turn cast the gaps. The exemplary wall structures 160 are straight with the exception of guide turns 170 extending a short distance from the leading edge 162 to guide air from a generally radially outward flow within the plenum 154 and shift that air generally axially. Although the outlet plenum 156 may have similar turns, modeling shows these to be less advantageous at the outlet plenum. The wall structures 160 span between adjacent interior faces 174A, 174B (FIG. 6).

The wall structures 160 may divide internal flows into smaller passages, thereby increasing surface area, more equally distributing, and/or accelerating internal flows. They may also tie the walls of the plate together to prevent ballooning under elevated temperatures and pressures.

The exemplary inlet plenum 154 converges in axial dimension from ID to OD or downstream along the first flowpath. Similarly, the exemplary outlet plenum 156 diverges in axial dimension from OD to ID or downstream along the first flowpath toward the outlet 152. Such respective convergence and divergence may reduce internal losses and prevents separation of flow.

Figure 5A:
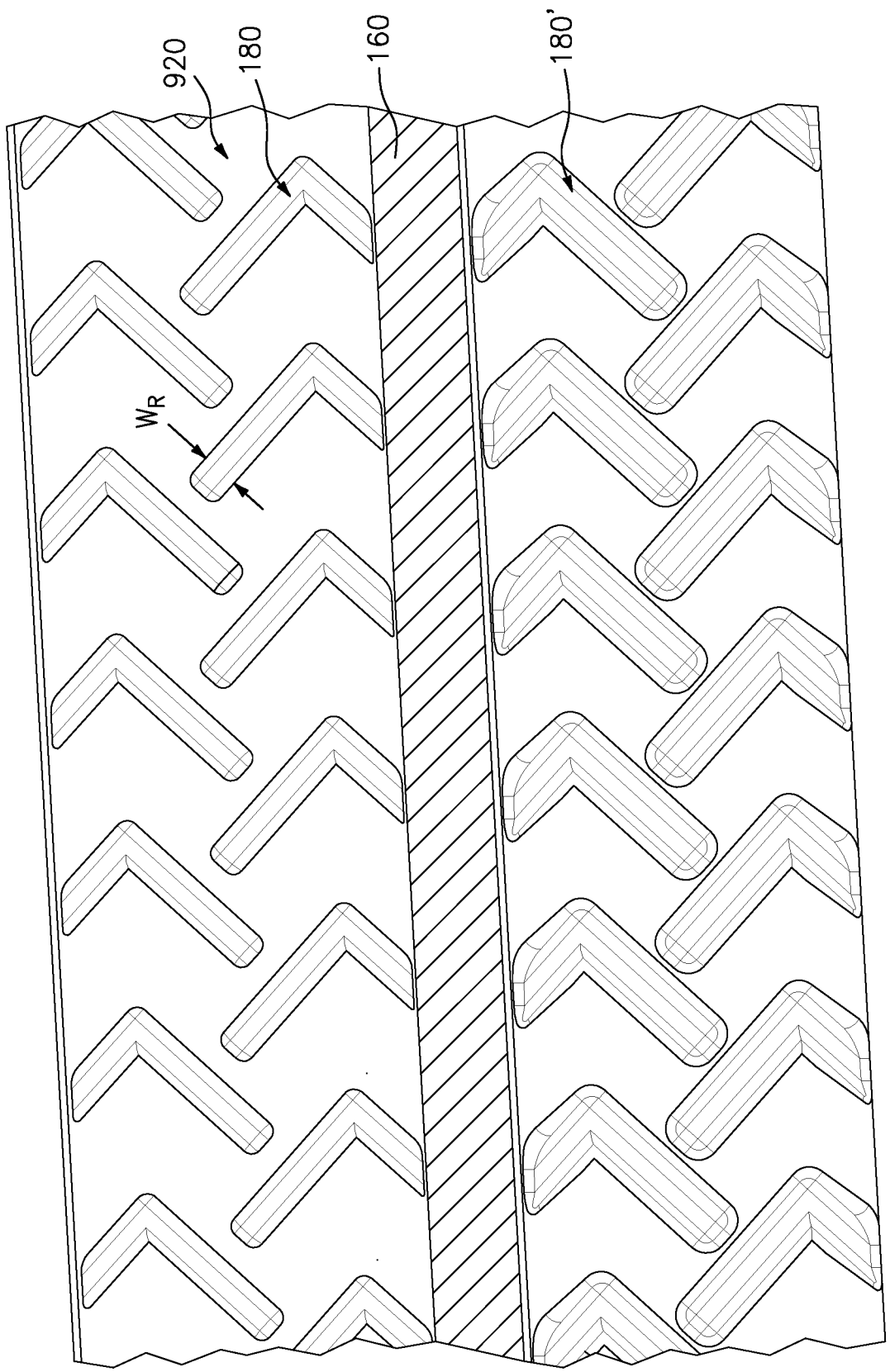
FIG. 5A is an enlarged view of a portion of the panel of FIG. 5.

The interior of the plate may optionally include integral surface enhancement features. FIG. 5A shows exemplary features 180/180' as chevron ribs, apex-upstream, within the flow passage legs 920. An exemplary configuration places the ribs in rows with two rows in each passageway, each row bridging up the adjacent surface of the adjacent wall 60 and opposite ends of the ribs of each row interdigitating slightly. The chevron features serve as trip strips to locally increase the surface friction at the boundary layer (increasing the local heat transfer coefficient) and to develop a mixing vortex within each passage leg 920 (to more uniformly distribute thermal energy within the first flowpath). Furthermore, there are a multitude of integral surface enhancement features known in the art. Notable alternatives include trip strips (or turbulators) perpendicular to the flow or skewed at an angle. Ribs 180' differ from the ribs 180 in that they have extended filleting.

FIG. 6 shows fin arrays 70 spanning the gaps between each adjacent plate substrate. The terminal plates in each array may similarly have fins spanning to the adjacent shroud 42 circumferential end 44, 46.

Figures 8, 8A:
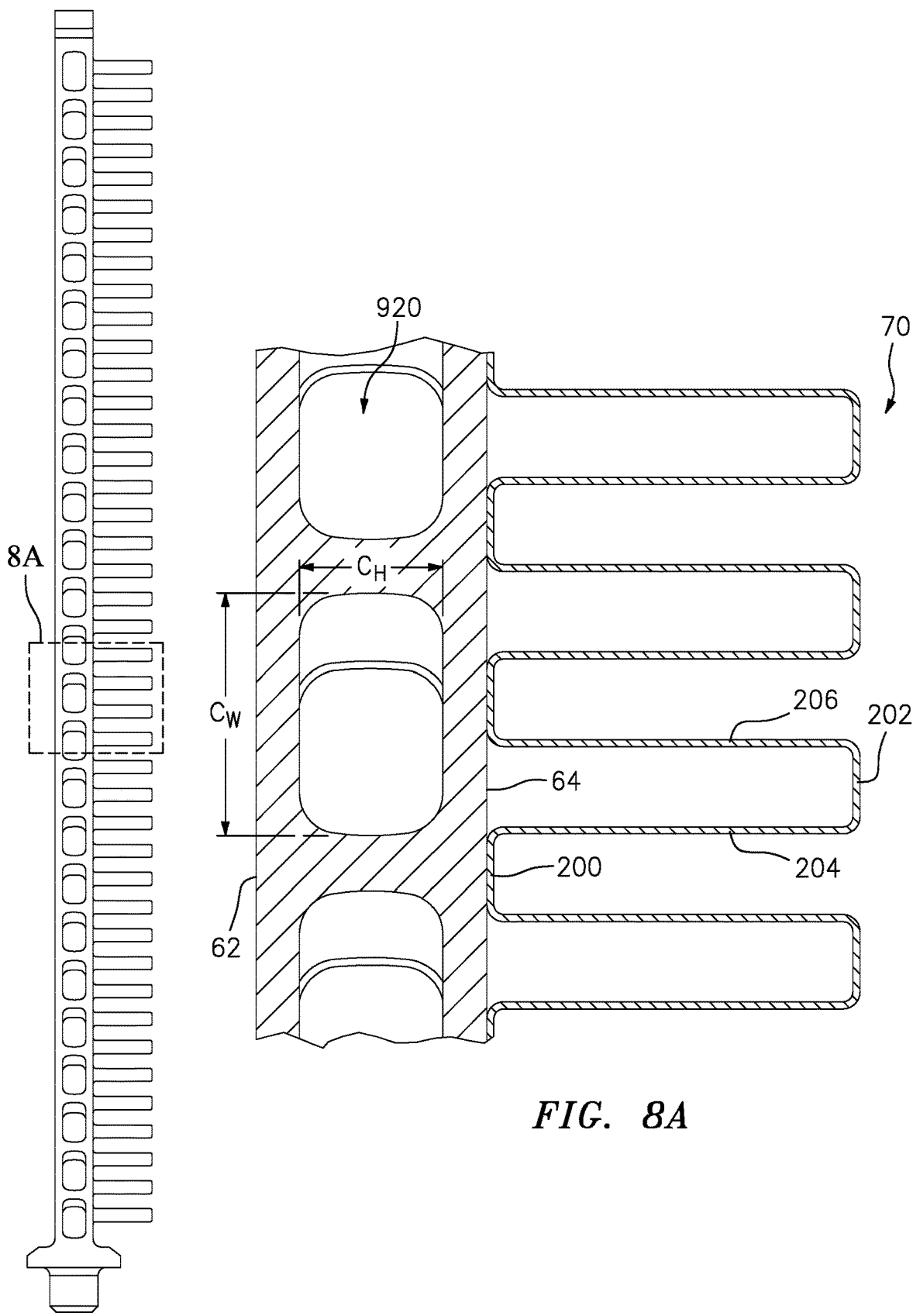
FIG. 8 is a transverse sectional view of the plate of FIG. 7 taken along line 8-8.
FIG. 8A is an enlarged view of the plate of FIG. 8.

FIG. 7 shows a preassembly of a plate substrate and a single fin array. The exemplary plate has an array only on the second circumferential face 64 so that the first circumferential face 62 of the adjacent plate to the second side of that plate does not have a separate such fin array. The exemplary square wave nature (e.g., with rounded corners) of the fin array 70 (FIG. 8A) has a series of troughs 200 and peaks 202 with legs 204, 206 extending between adjacent troughs and peaks. The legs thus form the ultimate fins. The exemplary troughs are attached to the second circumferential face 64 such as by welding, brazing, diffusion bonding, or the like. When a plate array is assembled, the peaks 202 will contact the adjacent first circumferential face 62 of the next plate substrate. To improve heat transfer, upon such assembly, there may be a diffusion bond, braze, or weld, securing the peaks 202 to such adjacent first circumferential face 62 (or the adjacent shroud wall). As noted above, where needed, a terminal plate in the plate bank may be initially fabricated with fin arrays 70 on both faces 62 and 64. FIG. 8A also identifies the cross-sectional width $C_W$ and the cross-sectional height $CH$ of the passage leg 920. These features are further discussed below.

As noted above, exemplary assembly techniques involve brazing the plates to the manifold unit 80. In several exemplary techniques, the shroud(s) 42 are used as an assembly aid. In several examples, the shroud(s) 42, manifold unit 80, plate substrates 52, and fin arrays 70 are separately formed. Ultimately, the shroud(s) are used to hold the associated plates to the manifold unit during further securing (e.g., brazing).

In one group of examples, the shrouds (e.g., bent and punched sheetmetal) are applied after the plates' substrates are temporarily mounted to the manifold. For example, finned plates may be preassembled by placing braze material (e.g., foil) between the relevant plate face(s) and the associated fin array(s). Each fin array may then be secured by one or more tack or resistance welds. Also, such a braze foil may be attached (e.g., tack or resistance welded) to a plate face that does not have its own fin array but will be brazed to the adjacent fin array of the adjacent plate.

The plates may then be preassembled to the manifold. For example, braze material may be applied to the manifold or the plates (e.g., braze paste applied to the features 100 or one or more foil sheets (e.g., precut to accommodate any plugs) applied to the features 100). The braze paste or foil may extend to regions of the manifold that will ultimately mate with the shroud. For example, FIG. 1 shows each shroud end wall 44, 46 including a base flange 47 along the surface 98 of the main body (FIG. 3). Then the plate proximal edge portions may be inserted to the features 100 (e.g., with the plate plugs mating with the associated manifold ports) and held (loosely) by gravity and/or the mechanical interfitting.

The shroud end wall 44, 46 inboard faces may receive braze material in similar fashion to the unfinned plate faces (e.g., tack welding of braze foil). The shroud may then be placed over the plate array and temporarily secured to the manifold. A temporary securing may involve tack welding of the flange 47 to the main body or may involve screws or other fasteners.

A clamping fixture (not shown—e.g., end plates joined by ratcheting bands or clamping screws) may be applied across the outboard faces of the shroud end walls 44, 46 (e.g., before or after the temporary securing of the shroud to the manifold) and tightened to apply a pre-compression force across the array of plates. The clamped assembly may be transferred to a braze oven, heated to braze the various components to each other, and then removed and cooled.

In other examples, the shrouds may act as a fixture to which the plates' substrates are pre-mounted (e.g., put in place with the shroud slots receiving the plate projections and secured via brazing). The plates may have the fin arrays already preassembled or the fin arrays and braze foils may then be inserted between plate substrates and between the terminal plate substrates and the shroud end walls. Optionally, the clamping fixture may then be applied. This preassembled combination may then be mated to the manifold unit with the respective plate proximal edges mating with the sockets 100 and the plate plugs mating with the associated manifold ports. Braze material (e.g., foil placed along the sockets 100) may be included in the assembly or braze material may subsequently be added.

The mating may contact the shroud(s) 42 and the manifold unit 80. The shroud may be temporarily secured such as in the prior example. As with the plates, braze foil may be pre-sandwiched between the flanges and the main body or braze material may be subsequently introduced. With the shroud(s) thus holding the plates in place, the braze process may be conducted (e.g., via heating the assembly in a furnace and melting the braze foils or by locally brazing).

Such processes may have one or more advantages. For example, it may mitigate the build-up of tolerances between adjacent components, creating narrow braze joints, and thereby improving fin-to substrate bonding.

Additionally, the shroud 42 may help protect the terminal fin arrays (at the ends of each plate array) from damage during installation of the heat exchanger to the engine, during engine operation, and during engine maintenance. The fin arrays may be constructed of thin material (≤0.010 inch thick) and are thus relatively fragile.

Furthermore, in use, the shrouds may help maintain consistent flow near the distal edge of the plates and at the terminal fin arrays (at the ends of each plate array). The shroud constrains the second flow stream within the fin arrays, which would otherwise escape through the open ended channels.

Such shrouds may be used with other panel arrangements. They may be used with non-parallel plates or with plates extending radially inward from a concave arcuate surface (in which case, the circumferential OD wall 48 would become a circumferential inner diameter (ID) wall).

Further shroud variations may integrate damping features allowing relative movement of plates to be frictionally damped. Examples are given in U.S. Patent Application No. 62/971,446 (the '446 application), filed Feb. 7, 2020, and entitled "Aircraft Heat Exchanger Panel Array Interconnection", the disclosure of which is incorporated by reference herein in its entirety as if set forth at length.

Figure 9:
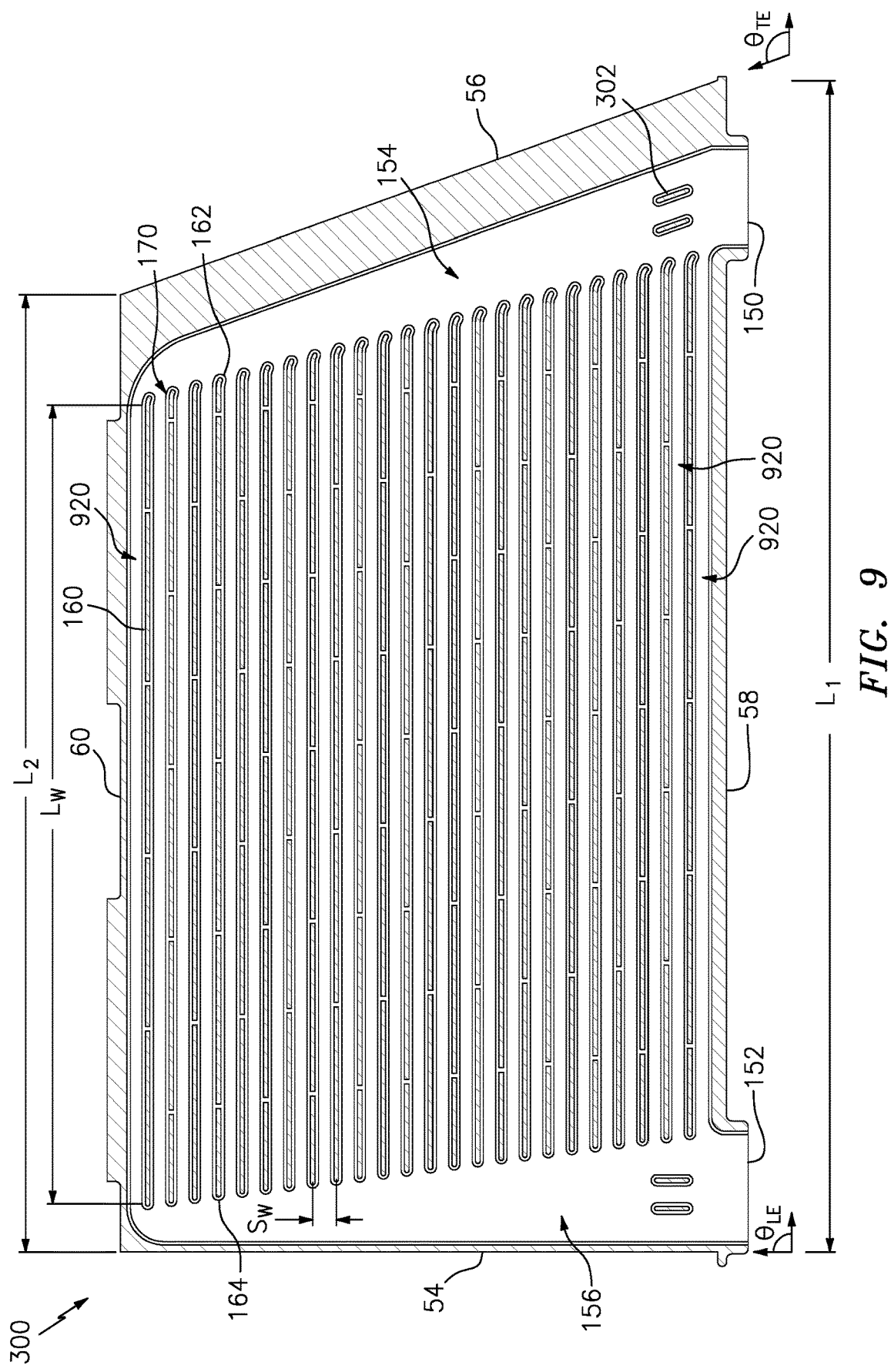
FIG. 9 is an axial sectional view of a second heat exchanger plate.

FIG. 9 shows a plate 300 which may be otherwise similar to the plate 50 but which adds reinforcement walls 302 joining the opposite faces 174A and 174B in the inlet plenum 154 and outlet plenum 156. The exemplary walls are in parallel pairs laterally spaced apart near the associated inlet 150 or outlet 152 and help structurally reinforce the casting.

FIG. 9 also shows several other geometric considerations. Wall 160 straight portion length $L_W$ and on-center spacing $S_W$ are shown. An angle θdLE of the leading edge relative to the downstream direction and an angle $\theta_{TE}$ of the trailing edge relative to the downstream direction are shown. Plate root length $L_1$ and plate tip length $L_2$ are shown.

$\theta_{LE}$ is essentially 90° (e.g., 88°-92°). This helps equally distribute oncoming flow 912 radially. An angled leading edge would result in redirection of oncoming flow towards the lagging end (ID or OD) of the leading edge.

$\theta_{TE}$ is greater than 90° (e.g., 95°-110°). This is desirable, because the associated taper in length will increase the natural frequency of the panel and reduce the susceptibility to rapid high cycle vibrations. The precise value may be a result of the design choices made for the internal casting core configuration regarding the taper of the inlet plenum 154 and outlet plenum 156, as well as the uniformity of the straight portion length $L_W$.

Figure 10:
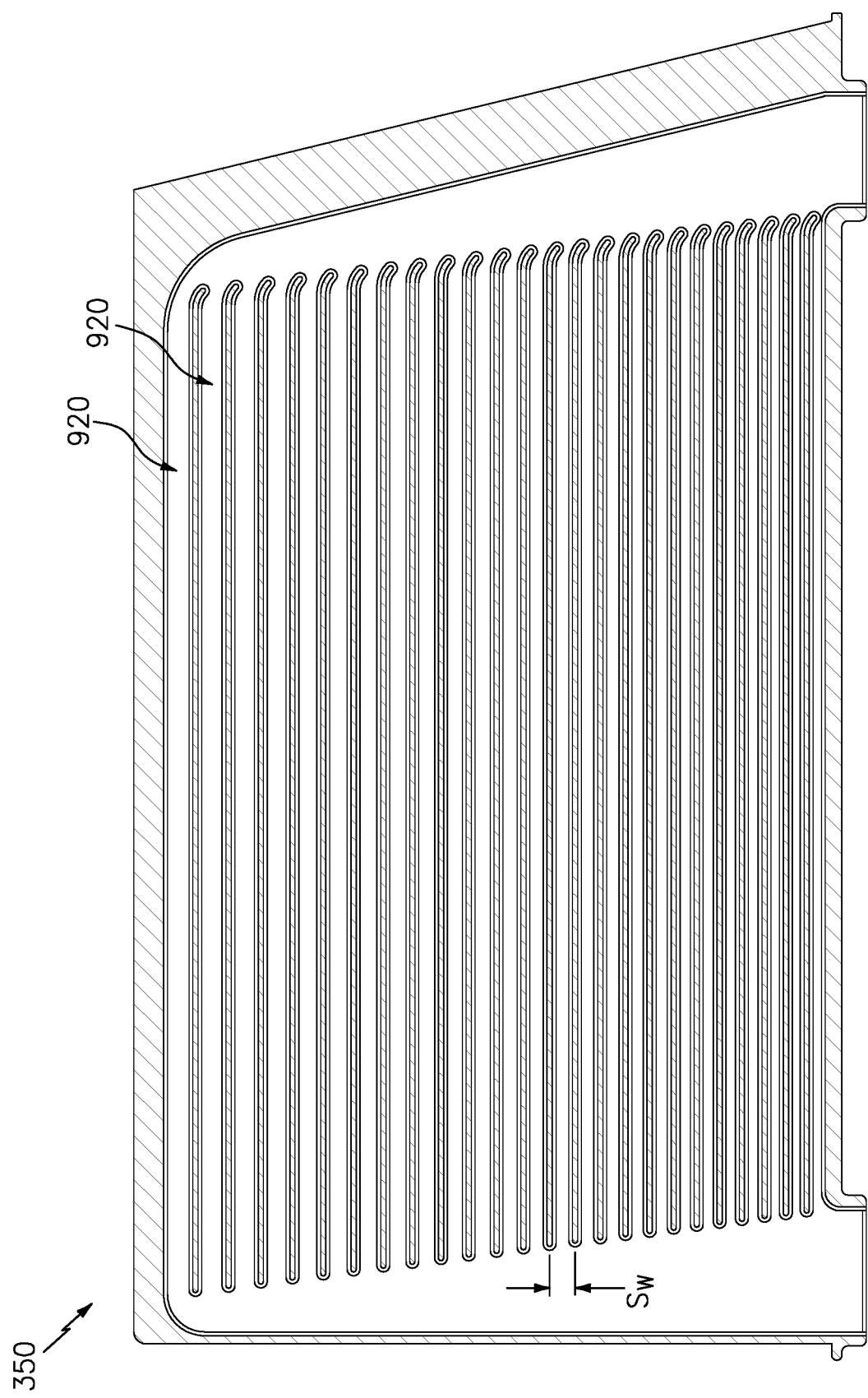
FIG. 10 is an axial sectional view of a third heat exchanger plate.

The configuration of the panel can cause unequal pressure distributions among the different passage legs 920 of the wall structure 160, resulting in flow being biased towards the passages near the root. Several options exist to vary the flow resistance among the passage legs 920 and equalize the flow. Firstly, the size, pitch, and/or quantity of trip-strips 180/180' may be non-uniform. This may even go so far as to leave a portion of the length $L_W$ to be without trip strips while another has (e.g., FIG. 11 discussed below). The second option is to progressively reduce the passage length $L_W$ near the tip of the panel (FIG. 9). The third option is to reduce the cross-sectional area of the passages near the root. This can include variations of the on-center spacing $S_W$ (plate/panel 350 of FIG. 10) and/or passage width $C_W$ (FIG. 8A) that are uniform along the length $L_W$, as well as a local variation in $C_W$ or passage height CH along the length $L_W$. An exemplary change is of about 1.0% in cross-sectional area from each leg to the next. For essentially constant CH, this means a corresponding 1.0% change in $C_W$. More broadly, an average change is from 0.01% to 5.0% or 0.10% to 2.0%, or 0.50% to 2.0%. Exemplary net spacing change may be 2.0% to 70% or 5.0% to 30%. A local method for varying the cross-sectional area can be accomplished by utilizing the length of guide turns 170. Longer guide turns 170 near the proximal edge 58 relative to the distal edge 60 will divert flow to the distal edge.

Figure 11:
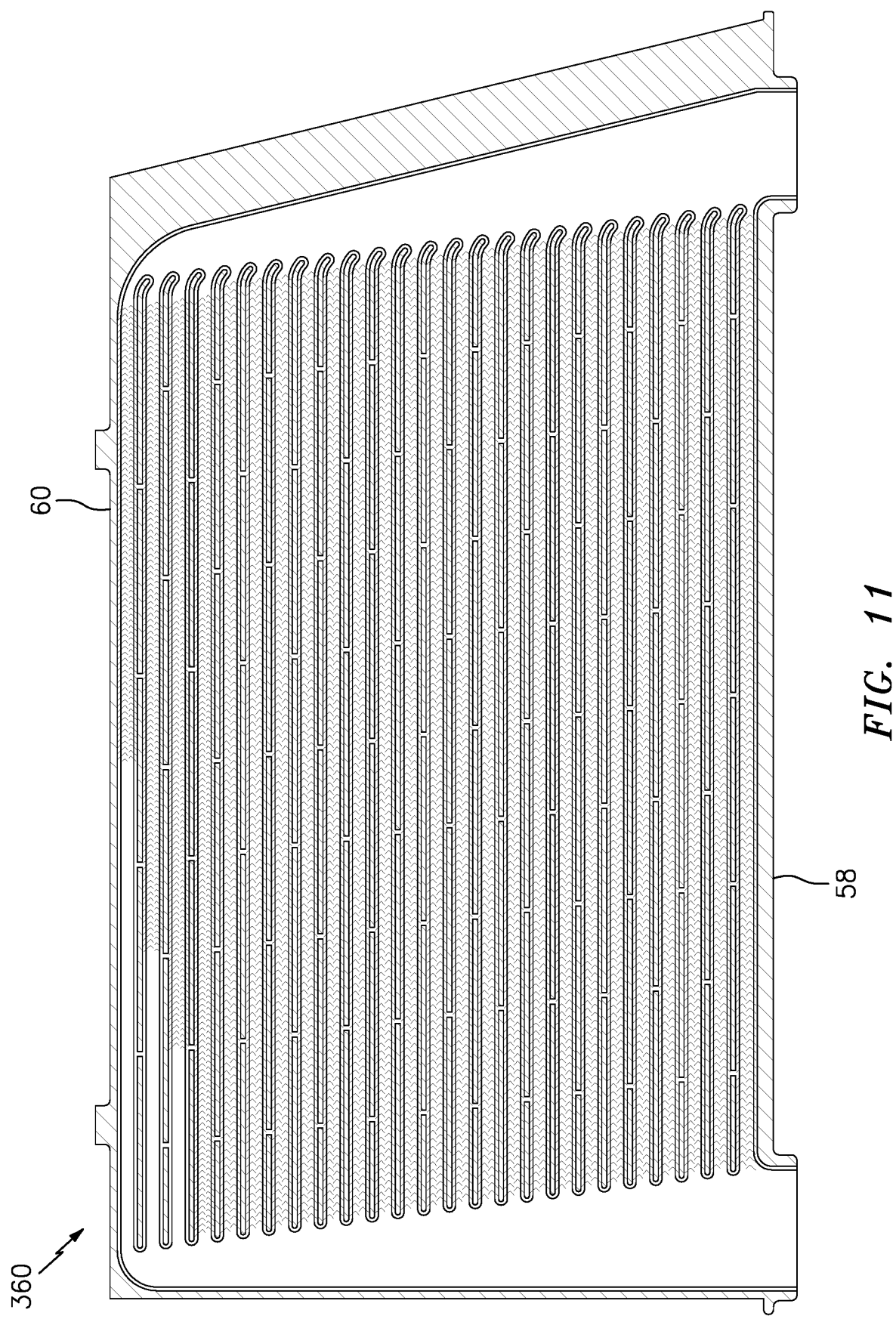
FIG. 11 is an axial sectional view of a fourth heat exchanger plate.

FIG. 11 shows a plate/panel 360 with further exemplary leg-to-leg variations in integral surface enhancements. A first variation is that the height and the width ($W_R$ of FIG. 5A) vary from leg-to-leg, generally progressively decreasing stepwise from the proximal edge 58 toward the distal edge 60. For example, multiple adjacent groups of the legs may have the same ribs. An exemplary progressive decrease in height and width is 50% (more broadly, 30% to 75% of the height and width of the largest ribs). This change may function to provide less backpressure in the passage legs 920 near the distal edge 60. This backpressure reduction functions to compensate for the uneven pressure distribution noted above and to help provide adequate flow near the distal edge.

A further illustrated change which may exist independently is the local absence of ribs in select areas of select legs. In particular, the exemplary embodiment shows the outermost few legs as lacking ribs along downstream portions. The length of the ribless area progressively increases within this group. This may function to provide less backpressure in the passage legs 920 near the distal edge 60.

Figure 12:
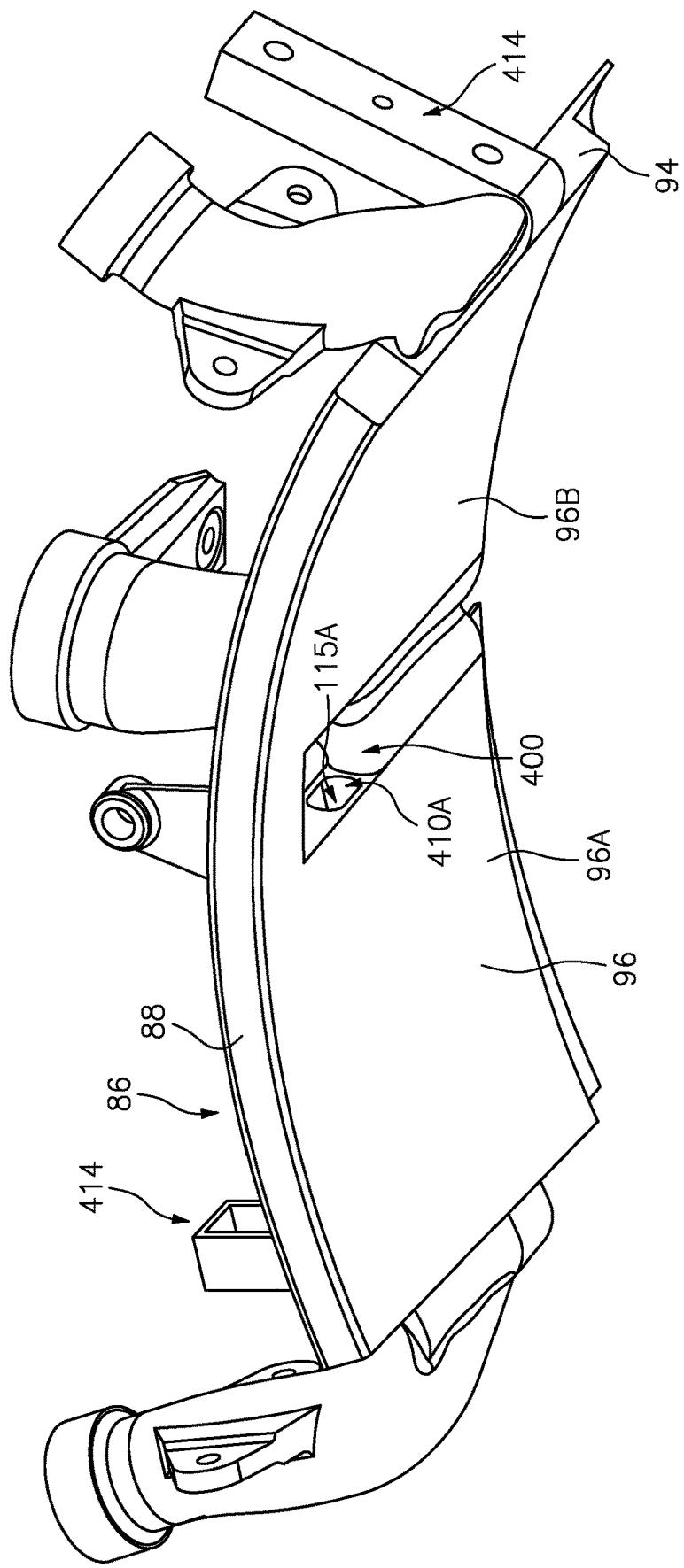
FIG. 12 is a first additional view of the ID manifold unit.
Figure 13:
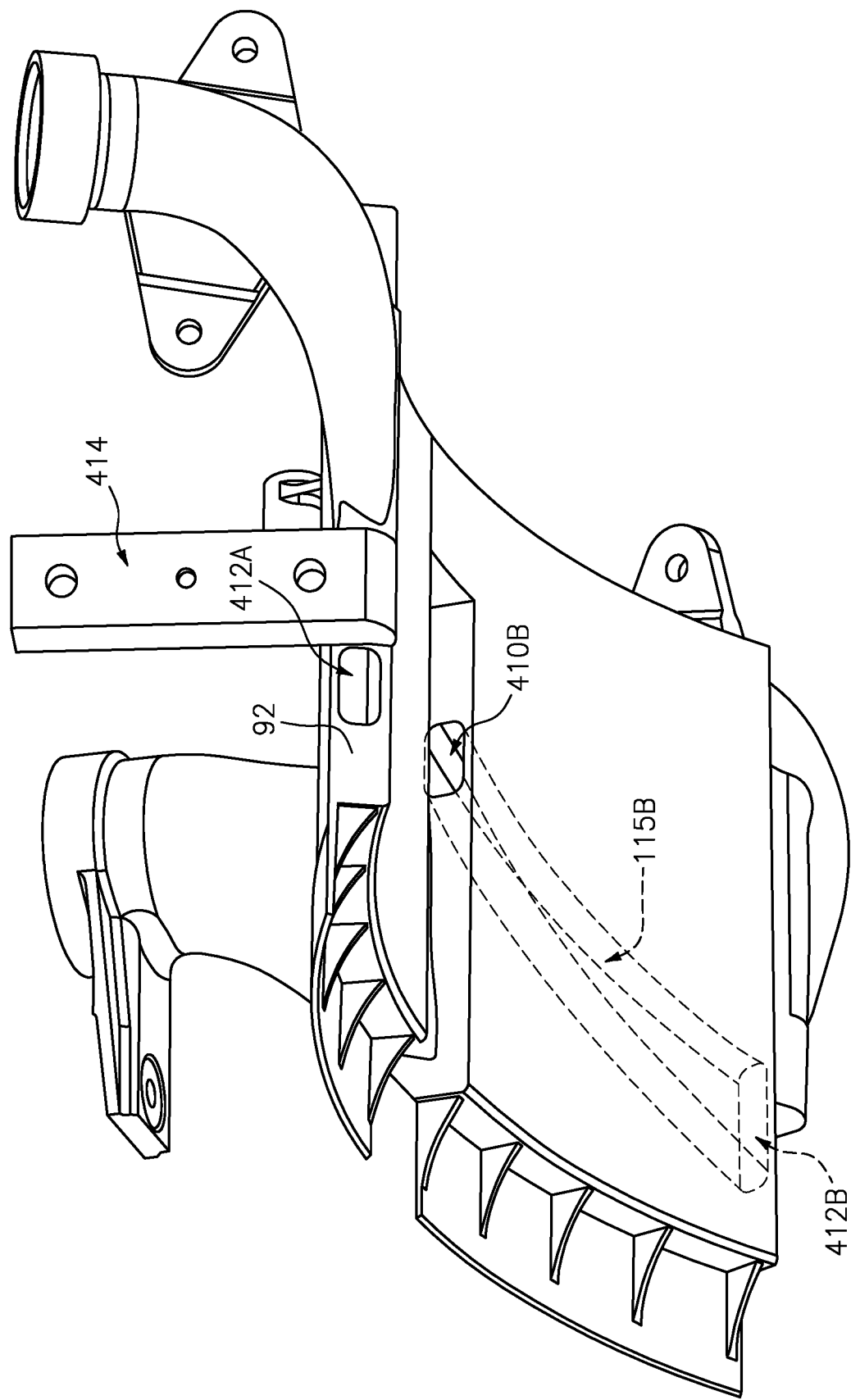
FIG. 13 is a second additional view of the ID manifold unit.

FIGS. 12 and 13 show further aspects of possible use of the dead space or buffer cavity 115 for cooling. FIG. 12 shows the main body 86 ID surface 96 as having a gap 400 between sections 96A and 96B that are intact cylindrical or frustoconical sections inboard of the respective associated panel banks. This divides a main body into respective sections associated with the panel banks. Each of the main body sections has an inner diameter port 410A, 410B to an associated branch passageway 115A, 115B of the buffer cavity. The branches extend to respective outlets 412A, 412B along the circumferential ends 92 and 94, respectively. In operation, circumferentially and radially-extending blocker/baffle structures (not shown) aside from the heat exchanger ends 92, 94 (e.g., attached to mounts 414) forward/upstream of the ports 412A, 412B may create low pressure zones at the ports 412A, 412B to draw the flow through the branches. Additional inlet scoop or other features (not shown) may help drive flow.

Figure 14:
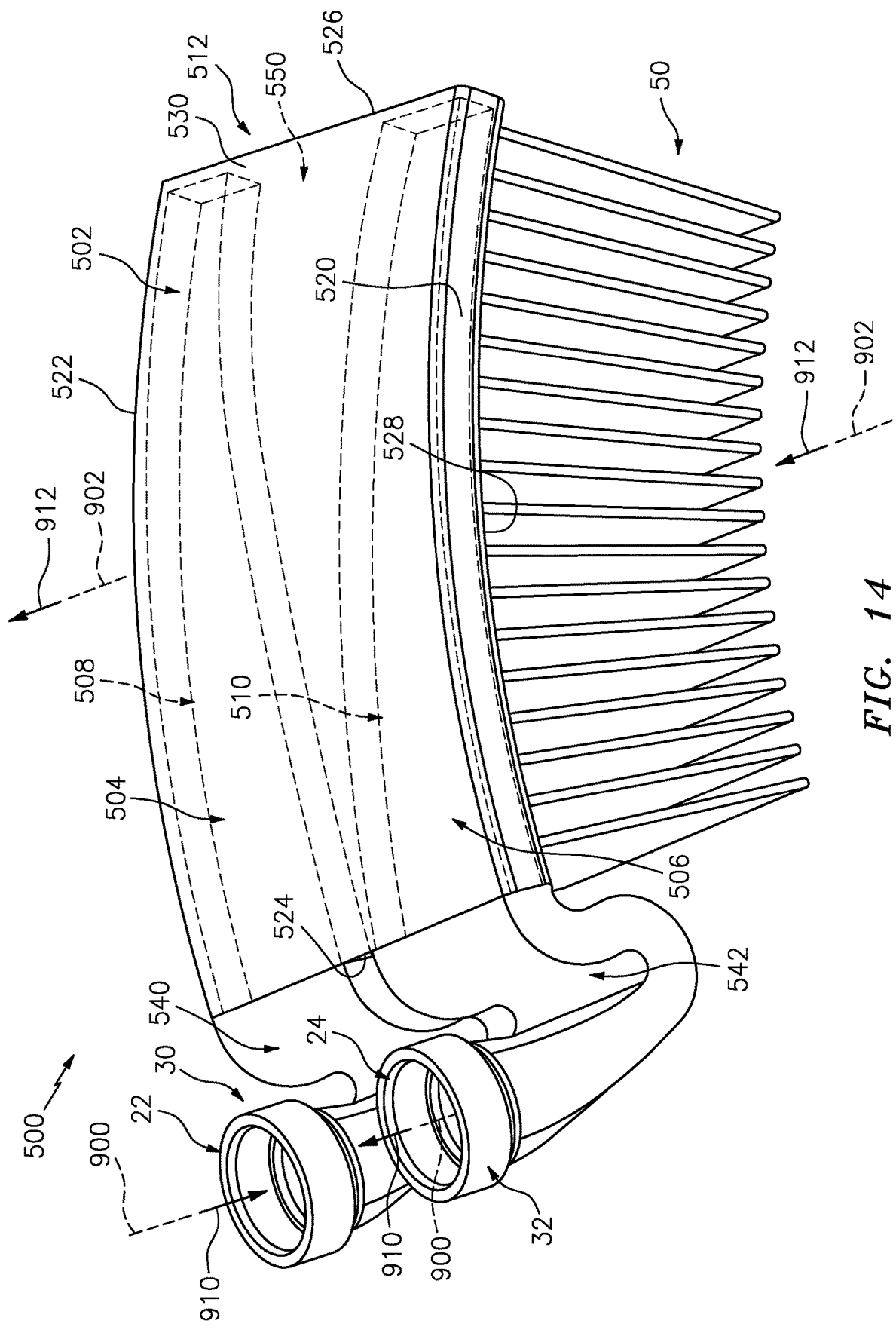
FIG. 14 is a first view of a second heat exchanger.
Figure 15:
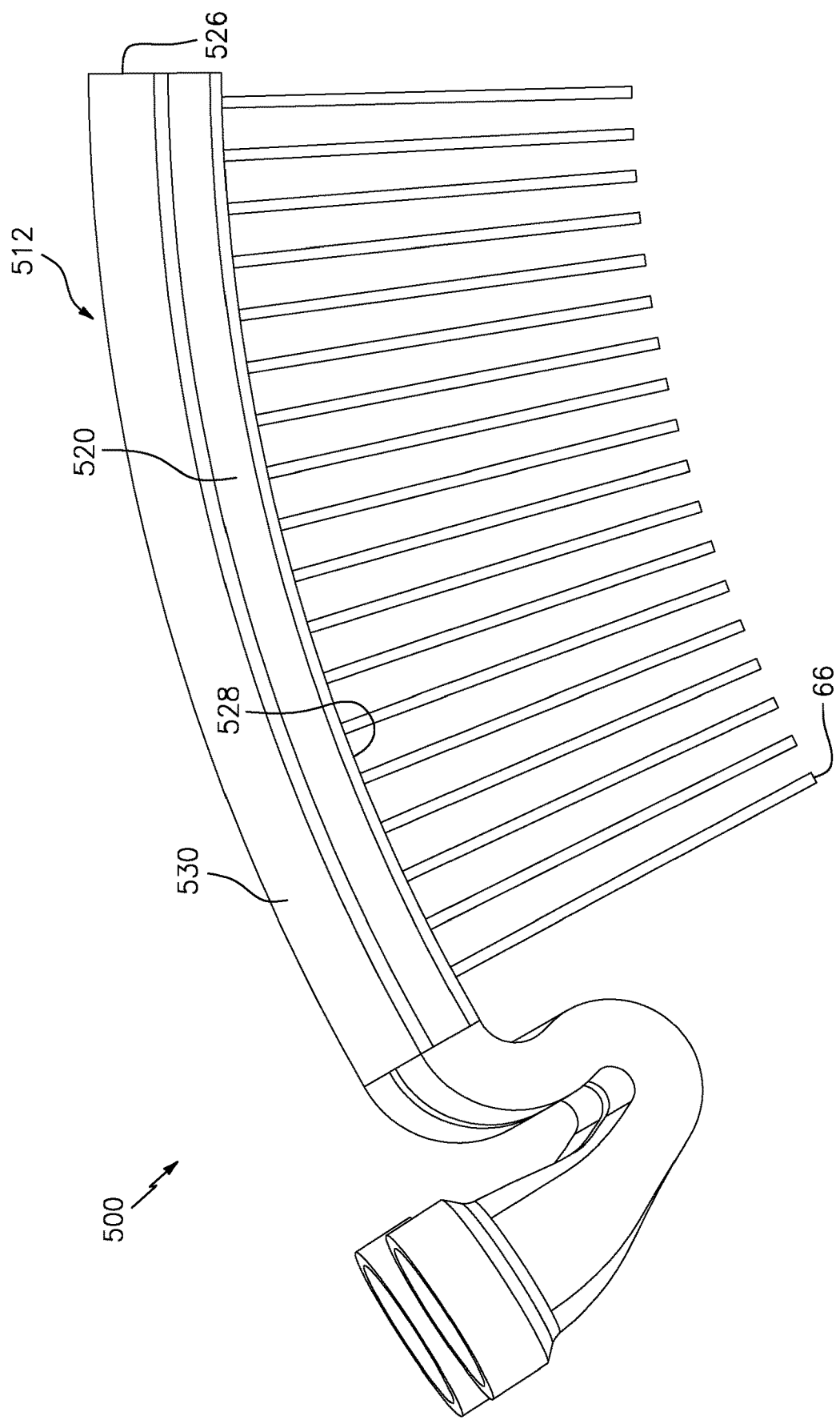
FIG. 15 is a second view of the second heat exchanger.

FIGS. 14 and 15 more schematically show an alternate heat exchanger 500 which may use any of the aforementioned plates/panels. The exemplary heat exchanger has a single inlet 22 and a single outlet 24 for the first flow 910. As with the heat exchanger 20, these are on respective fittings 30, 32. As with the exemplary heat exchanger 20, a single manifold structure 502 provides the inlet manifold 504 and outlet manifold 506 and their associated plenums 508 and 510. The structure 502 has a main body 512 having a leading end 520, a trailing end 522, a first circumferential end 524, a second circumferential end 526, an ID surface 528, and an OD surface 530. In this example, the ID surface 528 is concave circumferentially and the OD surface 530 is convex so that the manifold structure 502 is an outer diameter (OD) manifold from which the plates/panels 50 extend radially inward. In this particular example, the plates extend radially inward converging towards their distal edges 66 (FIG. 15). In alternative embodiments, the plates may be parallel to each other as in the exemplary heat exchanger 20.

A further difference of the exemplary heat exchanger 500 versus the exemplary heat exchanger 20 is that the inlet port and outlet port both are along conduits 540, 542 extending from one of the main body 512 circumferential ends. In the illustrated example, they extend from the same end although a further opposite end example is discussed below. In the illustrated example, the plenums 508, 510 still taper away from the associated conduit 540, 542. In this embodiment, the tapering allows a dead space 550 to be formed between facing walls of the plenums with the dead space diverging away from the circumferential end bearing the conduits.

One relevant aspect of the exemplary heat exchanger main body 512 is that when formed as a cylindrical section (e.g., not frustoconical) two identical such main bodies may be assembled end-to-end so that their respective ports are at opposite ends of the assembly. Relative front-to-back symmetry of the main body allows the plates of one main body to be installed opposite those of the other main body (relative to the main body) so that all plates face the same direction along the second flowpath 902.

Figure 16:
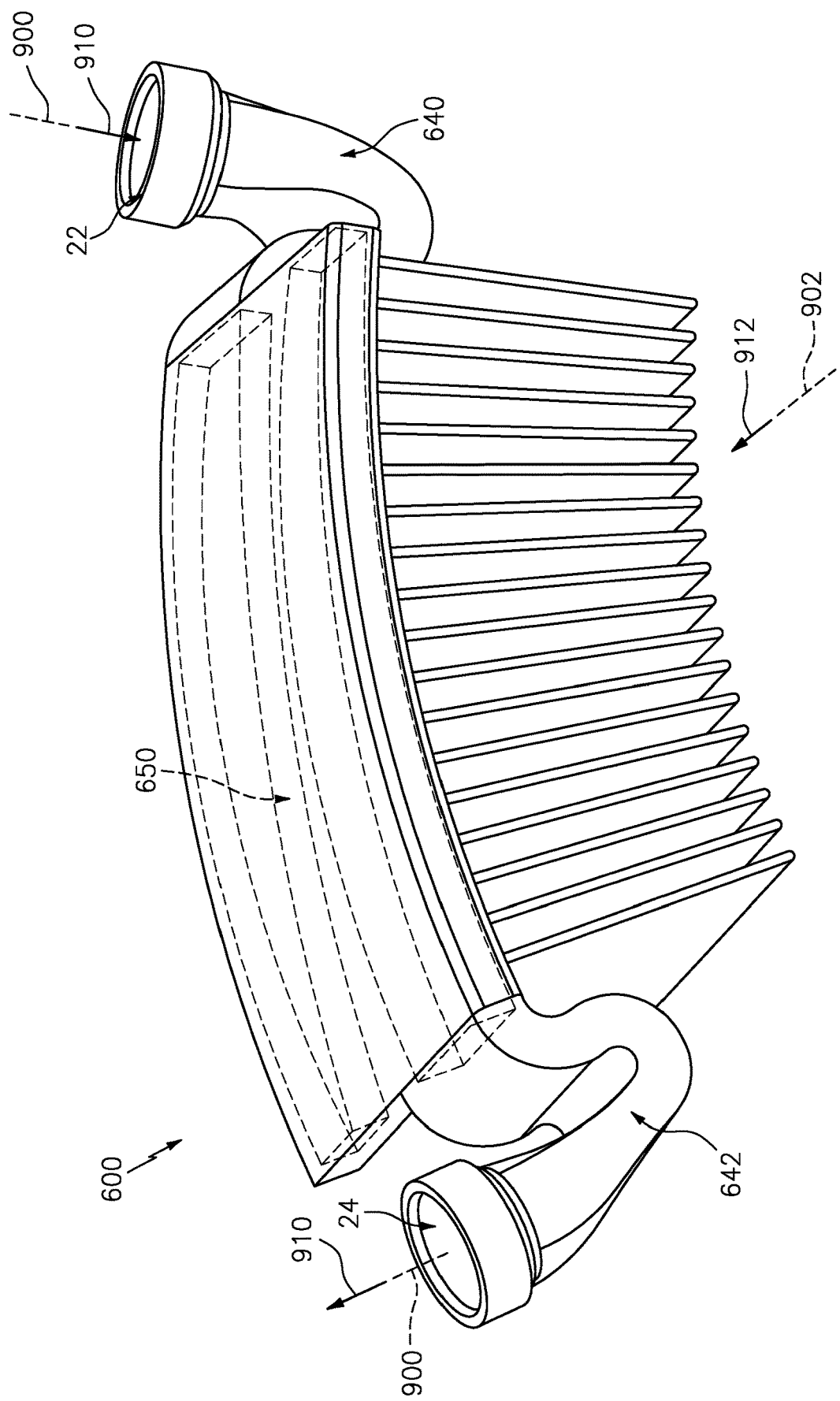
FIG. 16 is a first view of a third heat exchanger.

In yet a further variation of a heat exchanger 600 (FIG. 16) based on the heat exchanger 500 discussed above, the conduits 640 and 642 may be on opposite circumferential ends so that the dead space 650 extends diagonally across the main body similar to the buffer cavity 115 of heat exchanger 20.

Figure 17:
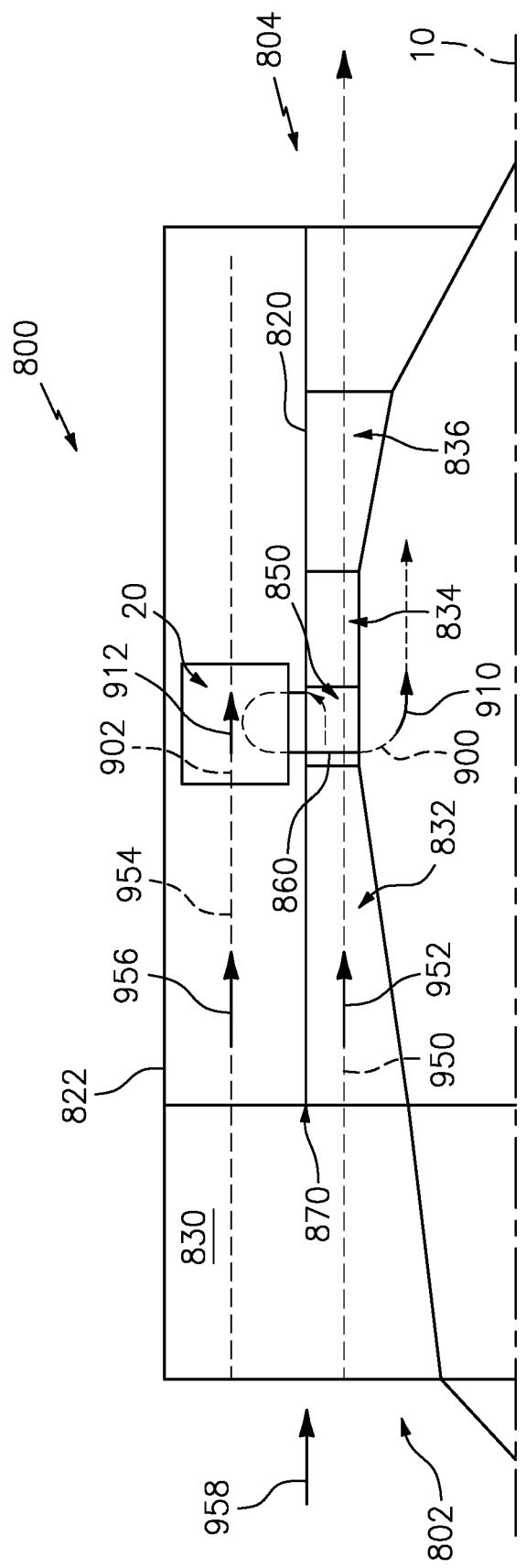
FIG. 17 is a schematic view of a gas turbine engine including the heat exchanger of FIG. 1.

FIG. 17 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and a lower pressure downstream turbine section also driving the fan (optionally via a gear reduction). Yet other arrangements are possible.

FIG. 17 shows the heat exchanger 20 (or other heat exchanger above) positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for providing thermal energy transfer between a first flow along a first flowpath and a second flow along a second flowpath, the heat exchanger comprising:
   at least one plate bank comprising a plurality of plates, each plate having:
      a first face and a second face opposite the first face;
      a leading edge along the second flowpath and a trailing edge along the second flowpath;
      a proximal edge having at least one inlet port along the first flowpath and at least one outlet port along the first flowpath; and
   at least one passageway along the first flowpath;
   an inlet manifold having at least one inlet port and at least one outlet port;
   an outlet manifold having at least one outlet port and at least one inlet port, the first flowpath passing from the at least one inlet port of the inlet manifold, through the at least one passageway of each of the plurality of plates, and through the at least one outlet port of the outlet manifold; and
   a buffer cavity located between the inlet manifold and the outlet manifold and having at least one inlet and at least one outlet,
wherein:
   the buffer cavity divides two plenums of the outlet manifold to effectively form two outlet manifolds in a single piece or assembly.

2. The heat exchanger of claim 1 wherein, for each plate of the plurality of plates, the at least one passageway comprises:
   an inlet plenum extending from the at least one inlet port of the plate;
   an outlet plenum extending to the at least one outlet port of the plate; and
   a plurality of legs fluidically in parallel between the inlet plenum and the outlet plenum.

3. The heat exchanger of claim 2 wherein:
   the inlet plenum is adjacent the trailing edge; and
   the outlet plenum is adjacent the leading edge.

4. The heat exchanger of claim 1 wherein:
   the inlet manifold and outlet manifold are arcuate having a convex first face and a concave second face; and
   the at least one plate bank is mounted to the convex first face.

5. The heat exchanger of claim 1 wherein:
   the inlet manifold and outlet manifold are portions of a single unit.

6. The heat exchanger of claim 1 wherein:
   in the at least one plate bank, the plates are parallel to each other.

7. The heat exchanger of claim 1 wherein:
   the at least one plate bank is a first plate bank and a second plate bank;
   the inlet manifold at least one inlet port is a single inlet port between the first plate bank and the second plate bank; and
   the outlet manifold at least one outlet port is a first outlet port to an outboard side of the first plate bank and a second outlet port to an outboard side of the second plate bank.

8. The heat exchanger of claim 1 wherein:
   each said plate bank comprises a shroud interfitting with edge portions of the plates of said bank.

9. The heat exchanger of claim 8 wherein each shroud comprises:
   first and second end walls at opposite ends of the associated plate bank;
   respective first and second flanges securing the first and second end walls to the inlet manifold and outlet manifold; and
   a further wall interfitting with the edge portions.

10. The heat exchanger of claim 1 wherein each said plate bank comprises a shroud having:
    first and second end walls at opposite ends of the associated plate bank;
    respective first and second flanges securing the first and second end walls to the inlet manifold and outlet manifold; and
    a further wall joining the first and second end walls.

11. The heat exchanger of claim 1 wherein each plate further comprises:
    an external fin array.

12. The heat exchanger of claim 1 further comprising:
    respective external fin arrays connecting adjacent said plates.

13. A gas turbine engine including the heat exchanger of claim 1.

14. The gas turbine engine of claim 13 wherein:
    the first flow is a bleed flow; and
    the second flow is a bypass flow.

15. The gas turbine engine of claim 14 wherein:
    the heat exchanger is in a bypass flowpath.

16. The heat exchanger of claim 1 wherein:
    the inlet manifold and outlet manifold are portions of a manifold unit having a main body having a surface with a gap; and
    the buffer cavity comprises branches extending from inlets at the gap to respective outlets at respective circumferential ends of the main body.

17. A method for using the heat exchanger of claim 1, the method comprising:
    passing the first flow along the first flowpath; and
    passing the second flow along the second flowpath to transfer said thermal energy from the first flow to the second flow.

18. The method of claim 17 wherein:
    the second flow passes along the plate first faces and plate second faces.

19. A method for using a heat exchanger for providing thermal energy transfer between a first flow along a first flowpath and a second flow along a second flowpath, the heat exchanger comprising:
    at least one plate bank comprising a plurality of plates, each plate having:
       a first face and a second face opposite the first face;
       a leading edge along the second flowpath and a trailing edge along the second flowpath;
       a proximal edge having at least one inlet port along the first flowpath and at least one outlet port along the first flowpath; and
    at least one passageway along the first flowpath;
    an inlet manifold having at least one inlet port and at least one outlet port;

an outlet manifold having at least one outlet port and at least one inlet port, the first flowpath passing from the at least one inlet port of the inlet manifold, through the at least one passageway of each of the plurality of plates, and through the at least one outlet port of the outlet manifold; and a buffer cavity located between the inlet manifold and the outlet manifold and having at least one inlet and at least one outlet, the method comprising:

passing the first flow along the first flowpath;

passing the second flow along the second flowpath to transfer said thermal energy from the first flow to the second flow; and passing a diversion of the second flow through the buffer cavity.

20. A heat exchanger for providing thermal energy transfer between a first flow along a first flowpath and a second flow along a second flowpath, the heat exchanger comprising:

a first plate bank and a second plate bank, each plate bank comprising a plurality of plates, each plate having:
  a first face and a second face opposite the first face;
  a leading edge along the second flowpath and a trailing edge along the second flowpath;
  a proximal edge having at least one inlet port along the first flowpath and at least one outlet port along the first flowpath; and
  at least one passageway along the first flowpath;

an inlet manifold having at least one inlet port and at least one outlet port;

an outlet manifold having at least one outlet port and at least one inlet port, the first flowpath passing from the at least one inlet port of the inlet manifold, through the at least one passageway of each of the plurality of plates, and through the at least one outlet port of the outlet manifold; and a buffer cavity located between the inlet manifold and the outlet manifold and having at least one inlet and at least one outlet, wherein:
  the at least one plate bank is a first plate bank and a second plate bank;
  the inlet manifold at least one inlet port is a single inlet port between the first plate bank and the second plate bank; and
  the outlet manifold at least one outlet port is a first outlet port to an outboard side of the first plate bank and a second outlet port to an outboard side of the second plate bank.

21. A heat exchanger for providing thermal energy transfer between a first flow along a first flowpath and a second flow along a second flowpath, the heat exchanger comprising:

at least one plate bank comprising a plurality of plates, each plate having:
  a first face and a second face opposite the first face;
  a leading edge along the second flowpath and a trailing edge along the second flowpath;
  a proximal edge having at least one inlet port along the first flowpath and at least one outlet port along the first flowpath; and
  at least one passageway along the first flowpath;

an inlet manifold having at least one inlet port and at least one outlet port;

an outlet manifold having at least one outlet port and at least one inlet port, the first flowpath passing from the at least one inlet port of the inlet manifold, through the at least one passageway of each of the plurality of plates, and through the at least one outlet port of the outlet manifold; and a buffer cavity located between the inlet manifold and the outlet manifold, wherein:
  the inlet manifold and outlet manifold are portions of a manifold unit having a main body having a surface with a gap; and
  the buffer cavity comprises branches extending from inlets at the gap to respective outlets at respective circumferential ends of the main body.

* * * * *